United States Patent
Kang et al.

(10) Patent No.: US 12,238,190 B2
(45) Date of Patent: *Feb. 25, 2025

(54) METHOD OF PERFORMING COMMUNICATION LOAD BALANCING WITH MULTI-TEACHER REINFORCEMENT LEARNING, AND AN APPARATUS FOR THE SAME

(71) Applicant: SAMSUNG ELECTRONICS CO., LTD., Suwon-si (KR)

(72) Inventors: Jikun Kang, Montreal (CA); Xi Chen, Montreal (CA); Chengming Hu, Montreal (CA); Ju Wang, Brossard (CA); Gregory Lewis Dudek, Westmount (CA); Xue Liu, Montreal (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/351,201

(22) Filed: Jul. 12, 2023

(65) Prior Publication Data
US 2023/0353659 A1 Nov. 2, 2023

Related U.S. Application Data

(63) Continuation of application No. 17/957,811, filed on Sep. 30, 2022, now Pat. No. 11,750,719.
(Continued)

(51) Int. Cl.
H04L 67/5682 (2022.01)
H04L 41/16 (2022.01)
H04L 67/1004 (2022.01)

(52) U.S. Cl.
CPC .......... *H04L 67/5682* (2022.05); *H04L 41/16* (2013.01); *H04L 67/1004* (2013.01)

(58) Field of Classification Search
CPC .. H04L 67/5682; H04L 41/16; H04L 67/1004
See application file for complete search history.

(56) References Cited

U.S. PATENT DOCUMENTS

| | | |
|---|---|---|
| 2019/0356595 A1 | 11/2019 | Avidar et al. |
| 2021/0168684 A1 | 6/2021 | Kang et al. |

(Continued)

FOREIGN PATENT DOCUMENTS

| | | |
|---|---|---|
| CN | 109831806 B | 7/2021 |
| KR | 10-2021-0151644 A | 12/2021 |

(Continued)

OTHER PUBLICATIONS

Communication dated Jan. 16, 2023, issued by the International Searching Authority in counterpart International Application No. PCT/KR2022/015055 (PCT/ISA/220, PCT/ISA/210, and PCT/ISA/237).

(Continued)

*Primary Examiner* — Benjamin M Thieu
(74) *Attorney, Agent, or Firm* — Sughrue Mion, PLLC

(57) ABSTRACT

A server may be provided to obtain a load balancing artificial intelligence (AI) model for a plurality of base stations in a communication system. The server may obtain teacher models based on traffic data sets collected from the base stations, respectively; perform a policy rehearsal process including obtaining student models based on knowledge distillation from the teacher models, obtaining an ensemble student model by ensembling the student models, and obtaining a policy model by interacting with the ensemble student mode; provide the policy model to each of the base stations for a policy evaluation of the policy model; and based on a
(Continued)

training continue signal being received from at least one of the base stations as a result of the policy evaluation, update the ensemble student model and the policy model by performing the policy rehearsal process on the student models.

20 Claims, 16 Drawing Sheets

Related U.S. Application Data

(60) Provisional application No. 63/253,089, filed on Oct. 6, 2021.

(56) References Cited

U.S. PATENT DOCUMENTS

| | | | |
|---|---|---|---|
| 2021/0266247 A1* | 8/2021 | Sivaraj | G06N 5/01 |
| 2021/0289586 A1* | 9/2021 | Kerpez | H04W 72/0453 |
| 2022/0014471 A1* | 1/2022 | Arora | H04L 43/062 |
| 2023/0155702 A1* | 5/2023 | Wang | H04L 25/0202 |
| | | | 370/252 |

FOREIGN PATENT DOCUMENTS

| | | |
|---|---|---|
| WO | 2017/000557 A1 | 1/2017 |
| WO | 2020064134 A1 | 4/2020 |
| WO | 2021056043 A1 | 4/2021 |
| WO | 2021/169577 A1 | 9/2021 |

OTHER PUBLICATIONS

Kang et al., "MOBA: Multi-teacher Model Based Reinforcement Learning," Sep. 2021, Total 16 pages.
You et al., "Learning from Multiple Teacher Networks," KDD 2017 Research Paper, pp. 1285-1294, Aug. 2017, Total 11 pages.
Anonymous authors, "MOBA: Multi-Teacher Model Based Reinforcement Learning", ICLR 2022, pp. 1-15.
Extended European Search Report dated Oct. 28, 2024, issued by the European Patent Office in European Application No. 22878926.9.
Liu et al., "Developing Multi-Task Recommendations with Long-Term Rewards via Policy Distilled Reinforcement Learning", J. ACM, 2019, vol. 01, Article. 01, https://doi.org/10.1145/1122445.1122456, pp. 1-30 (30 pages total).

* cited by examiner

METHOD OF PERFORMING COMMUNICATION LOAD BALANCING WITH MULTI-TEACHER REINFORCEMENT LEARNING, AND AN APPARATUS FOR THE SAME

CROSS-REFERENCE TO RELATED APPLICATION(S)

This application is a continuation application of U.S. Ser. No. 17/957,811, filed Sep. 30, 2022, which is based on and claims priority under 35 U.S.C. § 119 to U.S. Provisional Patent Application No. 63/253,089, filed on Oct. 6, 2021, in the U.S. Patent & Trademark Office, the disclosures of which are incorporated by reference herein in their entireties.

BACKGROUND

1. Field

The disclosure relates to a method of performing load balancing in a communication system via multi-teacher reinforcement learning, and an apparatus for the same, and more particularly to a method for creating a generalized control policy using multiple teacher networks and multiple student networks and performing traffic load balancing based on the generalized control policy, and an apparatus for the same.

2. Description of Related Art

Communication traffic load balancing is essential for the performance of a mobile communication system, such as a fifth-generation (5G) or a sixth-generation (6G) mobile communication system. In the real world, since communication traffic patterns dynamically change in real time and each base station has limited resources, it is of critical importance to deploy resources as close to the actual demand as possible to maintain the system performance and also to avoid waste of resources.

Reinforcement learning (RL), particularly deep RL, can achieve adequate performance on different control tasks, such as traffic load balancing tasks. RL aims to learn an optimal control policy through interactions with the environment of a communication system. Deep RL combines neural networks with RL and further enables the RL agents to deal with more complex environments. However, deploying RL algorithms for real-world problems can be very challenging. Most online RL algorithms require a large number of interactions with the environment to learn a reliable control policy. This assumption of the availability of repeated interactions with the environment does not hold for many real-world applications due to safety concerns, costs/inconveniences related to interactions, or the lack of an accurate simulator to enable effective training in simulation prior to deployment and training in the real world. Thus, practical application of reinforcement learning algorithms in the real world is limited by its poor data efficiency and its inflexibility of learning in an offline fashion.

In order to reduce the amount of time of interactions with the environment and to improve efficiency, model-based RL utilizes a learned system model for predicting the system dynamics (i.e. states or rewards) and making a control plan accordingly. However, model-based methods suffer from a model-bias problem, where certain model spaces are inaccurate, resulting in unstable policy learning.

SUMMARY

Example embodiments address at least the above problems and/or disadvantages and other disadvantages not described above. Also, the example embodiments are not required to overcome the disadvantages described above, and may not overcome any of the problems described above.

According to an aspect of the disclosure, there is provided a server for obtaining a load balancing artificial intelligence (AI) model for a plurality of base stations in a communication system. The server may include at least one memory storing instructions; and at least one processor configured to execute the instructions to: obtain a plurality of teacher models based on a plurality of traffic data sets collected from the plurality of base stations, respectively; perform a policy rehearsal process including: obtaining a plurality of student models based on knowledge distillation from the plurality of teacher models; obtaining an ensemble student model by ensembling the plurality of student models; and obtaining a policy model by interacting with the ensemble student model; provide the policy model to each of the plurality of base stations for a policy evaluation of the policy model; and based on a training continue signal being received from at least one of the plurality of base stations as a result of the policy evaluation, update the ensemble student model and the policy model by performing the policy rehearsal process on the plurality of student models.

The least one processor may be further configured to execute the instructions to: obtain the plurality of teacher models by receiving model parameters of the plurality of teacher models from the plurality of base stations, and updating initialized model parameters of the plurality of teacher models based on the received model parameters.

The least one processor may be further configured to execute the instructions to: obtain the plurality of teacher models by receiving the plurality of traffic data sets from the plurality of base stations, and training the plurality of teacher models based on the plurality of traffic data sets, respectively.

The plurality of traffic data sets may include state-action-reward trajectories that include states, actions, and rewards. The states may include at least one of an active user equipment (UE) number, a bandwidth utilization, an internet protocol (IP) throughput, a cell physical resource usage, and a speed of a download link. The actions may include a load balancing parameter that causes the states to be changed. The rewards may include at least one of a minimum of IP throughput, a total IP throughput, and a dead cell count.

Each of the plurality of teacher models may include a state transition model and a reward transition model that are trained based on state-action-reward trajectories that are collected from the plurality of base stations. The state transition model may be configured to output a predicted next state based on an action taken in a current state. The reward transition model may be configured to output a predicted reward based on the action taken in the current state.

The obtaining the plurality of student models based on knowledge distillation from the plurality of teacher models, may include: computing a ground-truth loss based on a difference between a ground-truth value and a prediction of each of the plurality of student models; computing a knowledge distillation loss based on a difference between a teacher prediction of the plurality of teacher models and a student prediction of the plurality of student models; computing an aggregated loss that combines the ground-truth loss and the knowledge distillation loss; and training the plurality of student models by minimizing or converging the aggregated loss.

The obtaining the policy model may include: obtaining state-reward pairs from the plurality of student models; computing an average of the state-reward pairs; inputting the average of the state-reward pairs to the policy model to obtain an action as an output of the policy model; increasing a time step by one; based on the increased time step being less than a predetermined value, inputting the action to the plurality of student models to continue the policy rehearsal process; and based on the increased time step being equal to the predetermined value, terminating the policy rehearsal process and outputting the policy model.

The training continue signal may indicate that a reward obtained from the ensemble student model is less than a reward obtained from an existing load balancing model by a predetermined margin or more.

According to another aspect of the present disclosure, there is provided a method for obtaining a load balancing artificial intelligence (AI) model for a plurality of base stations in a communication system. The method may include: obtaining a plurality of teacher models based on a plurality of traffic data sets collected from the plurality of base stations, respectively; performing a policy rehearsal process by: obtaining a plurality of student models based on knowledge distillation from the plurality of teacher models; obtaining an ensemble student model by ensembling the plurality of student models; and obtaining a policy model by interacting with the ensemble student model; transmitting the policy model to each of the plurality of base stations for a policy evaluation of the policy model; and based on a training continue signal being received from at least one of the plurality of base stations as a result of the policy evaluation, updating the ensemble student model and the policy model by performing the policy rehearsal process on the plurality of student models.

The obtaining of the plurality of teacher models may include: receiving model parameters of the plurality of teacher models from the plurality of base stations; and updating initialized model parameters of the plurality of teacher models based on the received model parameters.

The obtaining of the plurality of teacher models may include: receiving the plurality of traffic data sets from the plurality of base stations, and training the plurality of teacher models based on the plurality of traffic data sets, respectively.

The plurality of traffic data sets may include state-action-reward trajectories. The state-action-reward trajectories may include states, actions, and rewards. The states may include at least one of an active user equipment (UE) number, a bandwidth utilization, an internet protocol (IP) throughput, a cell physical resource usage, and a speed of a download link. The actions may include a load balancing parameter that causes the states to be changed. The rewards may include at least one of a minimum of IP throughput, a total IP throughput, and a dead cell count.

Each of the plurality of teacher models may include a state transition model and a reward transition model that are trained based on state-action-reward trajectories that are collected from the plurality of base stations. The state transition model may be configured to output a predicted next state based on an action taken in a current state. The reward transition model may be configured to output a predicted reward based on the action taken in the current state.

The obtaining the plurality of student models based on knowledge distillation from the plurality of teacher models, may include: computing a ground-truth loss based on a difference between a ground-truth value and a prediction of each of the plurality of student models; computing a knowledge distillation loss based on a difference between a teacher prediction of the plurality of teacher models and a student prediction of the plurality of student models; computing an aggregated loss that combines the ground-truth loss and the knowledge distillation loss; and training the plurality of student models by minimizing or converging the aggregated loss.

The obtaining the policy model may include: obtaining state-reward pairs from the plurality of student models; computing an average of the state-reward pairs; inputting the average of the state-reward pairs to the policy model to obtain an action as an output of the policy model; increasing a time step by one; based on the increased time step being less than a predetermined value, inputting the action to the plurality of student models to continue the policy rehearsal process; and based on the increased time step being equal to the predetermined value, terminating the policy rehearsal process and outputting the policy model.

The training continue signal may indicate that a reward obtained from the ensemble student model is less than a reward obtained from an existing load balancing model by a predetermined margin or more.

According to another aspect of the present disclosure, there is provided a non-transitory computer-readable storage medium storing a program that is executable by at least one processor to perform the method for obtaining a load balancing artificial intelligence (AI) model for a plurality of base stations in a communication system.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

Figure 1:
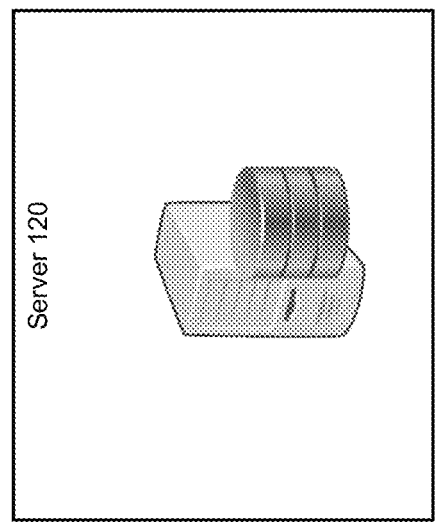
FIG. 1 is a diagram showing an overview of a system for performing traffic load balancing according to embodiments of the present disclosure.
Figure 1:
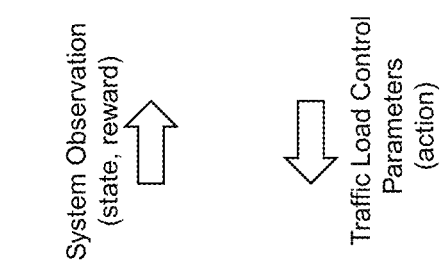
Figure 1:
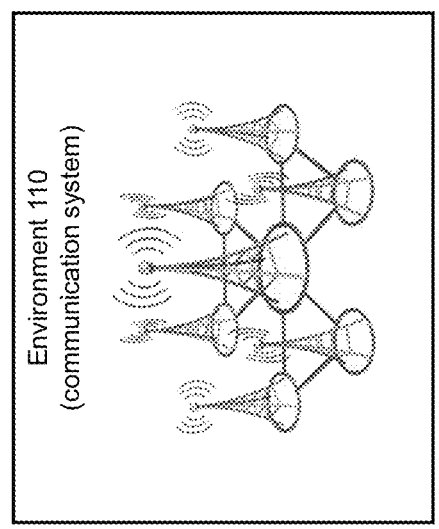

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

The term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

FIG. 1 is a diagram showing an overview of a system 100 for performing traffic load balancing according to embodiments of the present disclosure. The system 100 may be used to balance communication traffic loads among a plurality of cells served by each of a plurality of base stations. However, the embodiments of the present disclosure are not limited thereto, and the system 100 may be applied to any type of load balancing, for example, such as the balancing of electric loads, transportation traffic loads, and the like.

The system 100 may include an environment 110 and a server 120 that communicates with the environment 110. The environment 110 may include a communication system that provides a plurality of base stations and a plurality of (communication) cells managed by each of the plurality of base stations. The server 120 may obtain an observation result of the communication system to perform a multi-teacher model based reinforcement learning (RL) algorithm (MOBA), which leverages a plurality of teacher artificial intelligence (AI) models (hereinafter, referred to as "teacher models") to solve a model-bias problem. The result of observing the communication system may include trajectories of states, actions, and reward. The state-action-reward trajectories may indicate a temporal sequence of states which have changed as a response to actions taken in certain states, with rewards being received as a result of taking each of the actions. In reinforcement learning, the term "trajectory" may refer to a sequence of states and actions, or a sequence of states, actions, and rewards. The states may include any one or any combination of an active user equipment (UE) number, a bandwidth utilization, an internet protocol (IP) throughput, a cell physical resource usage, and a speed of a download link. The actions may include a load balancing parameter that causes the states to be changed, and the rewards may include any one or any combination of a minimum of IP throughput, a total IP throughput, a dead cell count, and other system metrics.

In MOBA according to embodiments of the present disclosure, different teacher models learn various instances of the communication system, and transfer their learned knowledge to a plurality of student AI models (hereinafter, referred to as "student models) so that the student models learn a generalized dynamic model that covers a state space. In order to overcome the instability of multi-teacher knowledge transfer, the server 120 may utilize the plurality of student models and apply an ensemble method to combine the plurality of student models. The server 120 may determine a control action for changing load balancing parameters of the plurality of base stations via an ensemble of the plurality of student models.

According to embodiments of the disclosure, a teacher model and a student model may include one or more neural networks, and model parameters may refer to parameters of the one or more neural networks, for example, such as weights and biases applied to neurons, the number of layers, the number of neurons in each layer, connections between layers, connections between neurons, and the like.

Figure 2:
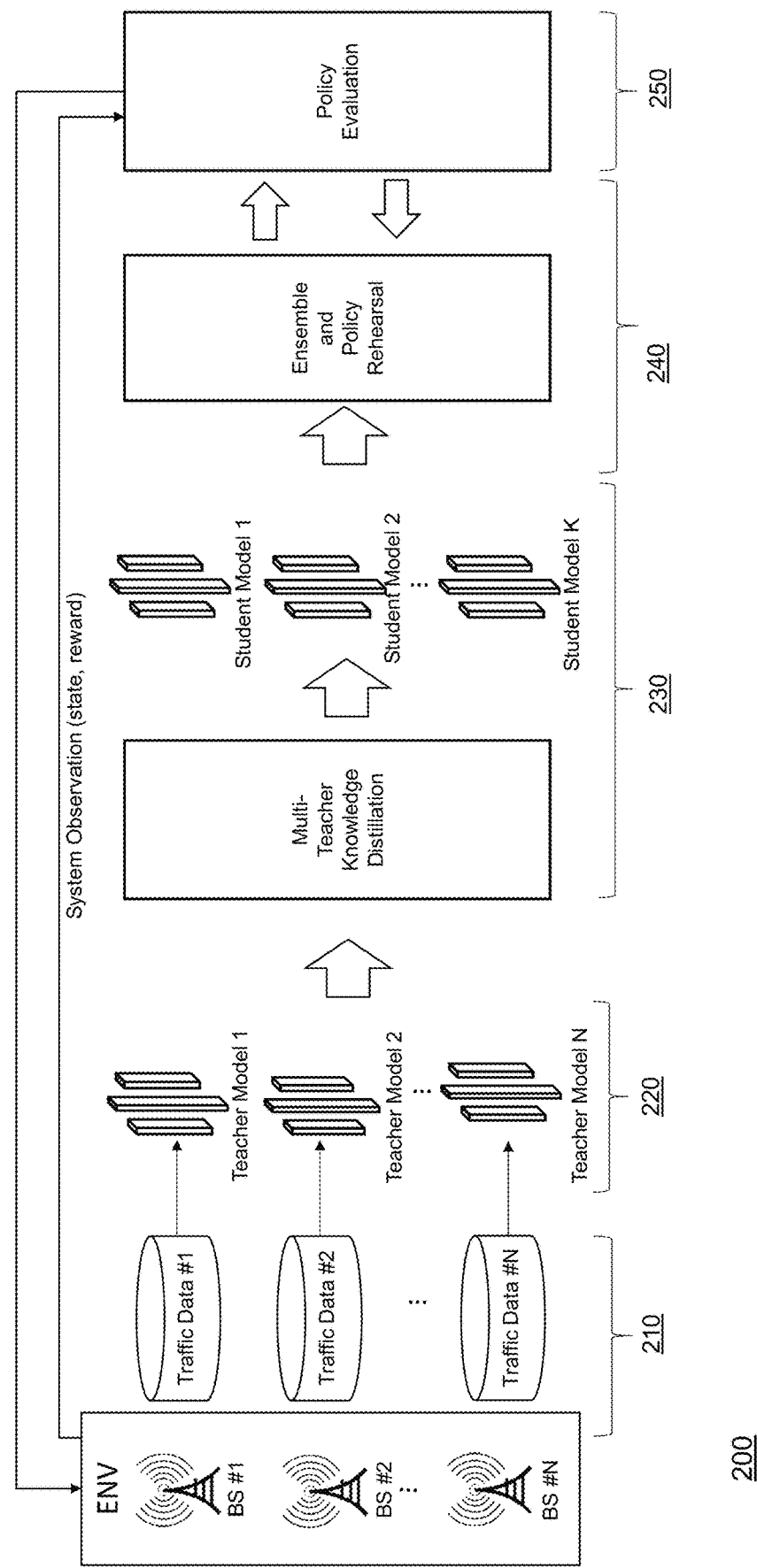
FIG. 2 is a diagram illustrating a method for generating a control policy for performing traffic load balancing according to embodiments of the present disclosure.

FIG. 2 is a diagram illustrating a method 200 for generating a control policy for performing traffic load balancing according to embodiments of the present disclosure.

The method 200 may include operation 210 of obtaining a plurality of traffic datasets (e.g., Traffic Data #1, Traffic Data #2, . . . , Traffic Data #N) collected from a plurality of base stations (e.g., BS #1, BS #2, . . . , BS #N), and storing the plurality of traffic datasets in their corresponding replay buffers.

Each of the plurality of traffic datasets may include M data points $\beta=\{(s_t, a_t, r_t, s'_t)|t=1, \ldots, M\}$ to leverage Markov Decision Process (MDP)-based reinforcement learning (RL), wherein s denotes a current state, a denotes an action, r denotes a reward, and s' denotes a predicted next state when the action is taken in the current state. The term "action" may refer to a control action taken by the communication system or the base station to perform the traffic load balancing between multiple base stations or between multiple cells covered by a single base station. For example, a control action of adjusting threshold values for load balancing features may be set as the "action." The term "reward" may refer to a value added to the current state in response to the "action" being taken at the current state. For example, a minimum IP throughput per cell may be set as the "reward" in embodiments of the present disclosure.

According to embodiments of the disclosure, the input of "state" may be expressed as a combination of a first vector indicating an average number of active user equipment (UEs) of each cell, a second vector indicating an average bandwidth utilization value of each cell, and a third vector indicating an average throughput of each cell. When there are four cells, a state may be expressed as [16.34, 15.25, 6.51, 2.91, 0.85, 0.72, 0.59, 0.25, 1.29, 1.11, 1.54, 1.67], where "16.34, 15.25, 6.51," "2.91, 0.85, 0.72," "0.59, 0.25, 1.29" and "1.11, 1.54, 1.67" correspond to the first, second, and third vectors for each of the four cells. The input of "action" for adjusting load balancing parameters of the base stations may be expressed as, for example, [2.3, 3.6, 5.1, 0.5, 1.0, 0.0, . . . , 5.5, 5.6, 3.1, 8.1, 9.9, 10.0] in a dB scale.

The method 200 may include operation 220 of obtaining a plurality of teacher models (e.g., Teacher Model 1, Teacher Model 2, . . . , Teacher Model N), based on the traffic data collected from the plurality of base stations, respectively.

In operation 220, each of the plurality of teacher models may be trained using its own local traffic data, via a discrete-time finite Markov decision process (MDP)-based RL in which a policy agent model aims to learn an optimal control policy by interacting with the environment of the communication system. An RL problem may be formulated as a Markov Decision Process (MDP), such as a tuple (S, A, p, r), wherein S denotes a state space, A denotes an action space, p: $S \otimes A \rightarrow S'$ denotes a state transition function, r: $S \otimes A \rightarrow R$ denotes a reward function. Each of the teacher models learns an agent policy configured to output a sequence of states and actions which can collect the largest expected return. The expected return may be expressed as $\eta(\theta) = \mathbb{E}[\Sigma_t^T \gamma^t, r_t]$, where T denotes a preset time (e.g., 24 hours), and $\gamma$ a discount factor. At each iteration step, the teacher models may update their model parameters to minimize a teacher loss and thereby to maximize a log-likelihood of a state transition distribution and a reward transition distribution. A loss is considered as being minimized or converging when the loss has reached a preset minimum threshold, or the loss does not reduce any longer and therefore has reached a constant value (with a preset margin). The teacher loss may be computed as expressed in Equation (1):

$$L_T = \sum_{k=1}^{N} \sum_{(s_t, a_t, s_{t+1}, r_t) \in D_k} \left[ \left\| s_{t+1} - f_{\phi_k^T}(s_t, a_t) \right\|_2^2 + \left\| r_t - f_{\eta_k^T}(s_t, a_t) \right\|_2^2 \right] \quad (1)$$

Where $f_{\phi_k^T}$ denotes the state transition model configured to receive as inputs, a current state $s_t$ and an action $a_t$ to be taken in the current state $s_t$, and output a predicted next state $\hat{s}_{t+1}$, $s_{t+1}$ denotes a ground-truth next state. $f_{\eta_k^T}$ denotes the reward transition model configured to receive as inputs, the current state $s_t$ and the action $a_t$ to be taken in the current state $s_t$, and output a predicted reward $\hat{r}_{t+1}$ to be given as a result of taking the action $a_t$ in the current state $s_t$, and $r_t$ is a ground-truth reward.

Operation 220 will be described in further detail with reference to FIGS. 3A-3C.

The method 200 may include operation 230 of obtaining a plurality of student models (e.g., Student Model 1, Student Model 2, . . . , Student Model K). The number of student models may be the same as or different from the number of teacher models. Each student model may have the same or substantially the same network structure as the teacher models. For example, each student model may include a state transition distribution and a reward transition distribution. The plurality of student models may be initialized with different model parameters. For example, different sets of model parameters may be randomly and/or uniformly sampled from a plurality of sets of model parameters for the initialization of the student models.

In operation 230, the plurality of teacher models (instead of traffic data collected from base stations) may be aggregated via multi-teacher knowledge distillation to train a student model (e.g., Student Model 1) that provides an action for controlling its target base station (e.g., BS #1). When there are plural student models, the multi-teacher knowledge is transferred from the plurality of teacher models (e.g., Teacher Model 1, Teacher Model 2, . . . , Teacher Model N) to each of the student models (e.g. Student Model 1, Student Model 2, . . . , Student Model K). A model aggregation according to an embodiment may address a limited bandwidth issue of data aggregation.

In embodiments of the present disclosure, knowledge (e.g., teacher predictions) distilled from the plurality of teacher models is integrated and the integrated knowledge is provided to each of the student models to improve the prediction accuracy of each of the student models. For example, an average of the predictions of the plurality of teacher models may be provided to each of the student models as the integrated knowledge. For these teacher models, each student model is trained via a knowledge distillation (KD) process to minimize or converge a student loss that combines a ground-truth loss between a prediction of the student model and a ground-truth value, and a KD loss between the prediction of the student model and predictions of the teacher model. For example, the student loss may be expressed in Equation (2):

$$L_s = \Sigma_{k=1}^{N} \Sigma_{(s_t, a_t, s_{t+1}) \in D_k} [\|s_{t+1} - f_{\phi^s}(s_t, a_t)\|_2^2 + \|f_{\phi_k^T}(s_t, a_t) - f_{\phi^s}(s_t, a_t)\|_2^2] \quad (2)$$

Where $f_{\phi^s}$ denote a student model, $f_{\phi^s}(s_t, a_t)$ denotes a predicted state of the student model, $s_{t+1}$ denotes a ground-truth state, and $f_{\phi_k^T}(s_t, a_t)$ denotes a predicted state of the teacher models (e.g., an average of predicted states of the teacher models). $\|s_{t+1} - f_{\phi^s}(s_t, a_t)\|_2^2$ represents the ground-truth loss, and $\|f_{\phi_k^T}(s_t, a_t) - f_{\phi^s}(s_t, a_t)\|_2^2$ represents the KD loss.

Operation 230 will be described in further detail with reference to FIG. 4.

The method 200 may include operation 240 of obtaining an ensemble of the plurality of student models for a policy rehearsal. At each iteration time step t, a student model computes a predicated state $s_{t+1}$ and reward $r_t$, which mirrors the structure of an MDP model that computes an approximate MDP model with an expected reward and state for a given state and action.

In operation 240, a state ensemble may be computed by averaging predicted next states of the student models, and a reward ensemble may be computed by averaging predicted rewards of the student models. For example, the state ensemble $\hat{s}_{t+1}$ and the reward ensemble $\hat{r}_t$ may be expressed in Equations (3) and (4):

$$\hat{s}_{t+1} = \frac{1}{K} \sum_{k=1}^{K} [f_{\phi_k^s}(s_t, a_t)] \quad (3)$$

$$\hat{r}_t = \frac{1}{K} \sum_{k=1}^{K} [f_{\eta_k^s}(s_t, a_t)] \quad (4)$$

where K is the total number of student models, $f_{\phi}^T$ is the state transition model of the student model, and $f_{\eta}^T$ is the reward transition model of the student model.

The state ensemble and the reward ensemble may be provided to an agent policy model (also referred to as "policy model") which applies a policy learning algorithm, such as Proximal Policy Optimization (PPO), Deep Deterministic Policy Gradient (DDPG), Twin-delayed DDPG, or Soft Actor-Critic (SAC), to learn and update a control policy. The agent policy model may be trained to minimize or converge a policy rehearsal loss, which decreases as the predicted return that is expressed in Equation (5) increases:

$$\hat{\eta}(\theta; \phi_s) = E_{\hat{\tau}}[\Sigma_{t=0}^{T} r(s_t, a_t)] \quad (5)$$

The agent policy model may be trained to maximize the above-identified predicted return, and thereby to minimize or converge the policy rehearsal loss.

Operation 240 will be described in further detail with reference to FIG. 5.

The method 200 may include operation 250 of evaluating policy actions that are provided from the ensemble of the plurality of student models, with interaction with the real communication environment.

In operation 250, a return is computed based on a new control policy applied to the agent policy model. The agent policy model may output an action to be taken in a current state based on the new control policy, and may collect a reward that is given as a result of taking the action. The expected return of the new control policy is computed by adding up the collected rewards. For example, the expected return may be computed using Equation (6):

$$\eta(\theta) = \mathbb{E}[\Sigma_{t=0}^{T} r(s_t, a_t)] \quad (6)$$

Where $\mathbb{E}$ denotes an expectation function, and T denotes a predetermined number of iteration time steps.

The return of the new control policy may be compared with a return of an old control policy. When the return of the new control policy is less than the return of the old control policy by a predetermined margin or more, the new control policy is determined not to improve any longer, and therefore the policy learning is terminated. For example, the policy learning is terminated when the current control policy meets the following Equation (7):

$$\frac{1}{T} \sum_{t=1}^{T} \mathbb{1}[\eta(\theta_{new}) < \eta(\theta_{old}) + C] \quad (7)$$

Wherein $\mathbb{1}$ denotes an indicator function, which outputs a value 1 if the equation hold, C denotes a predetermined margin, and T denotes a predetermined number of iteration time steps.

Operation 250 will be described in further detail with reference to FIG. 6.

Figure 3A:
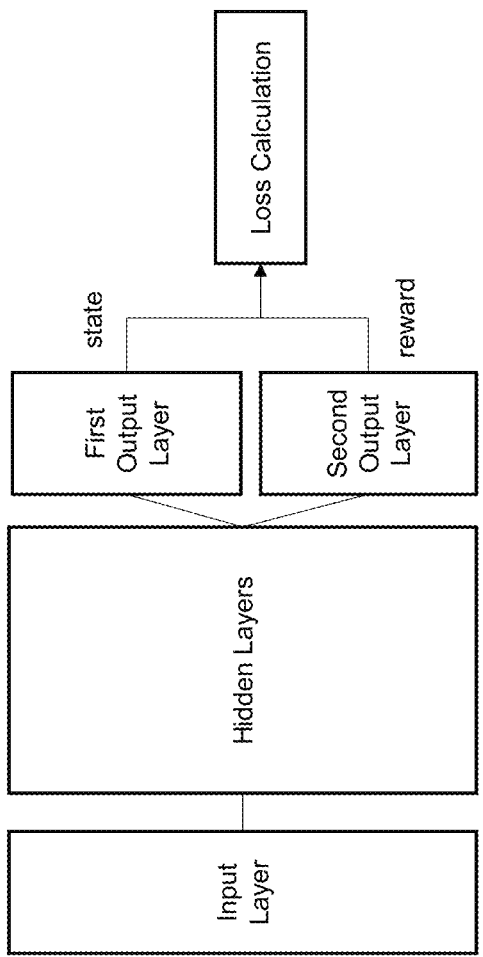
FIGS. 3A and 3B are diagrams illustrating a structure of a teacher model according to various embodiments of the present disclosure.
Figure 3B:
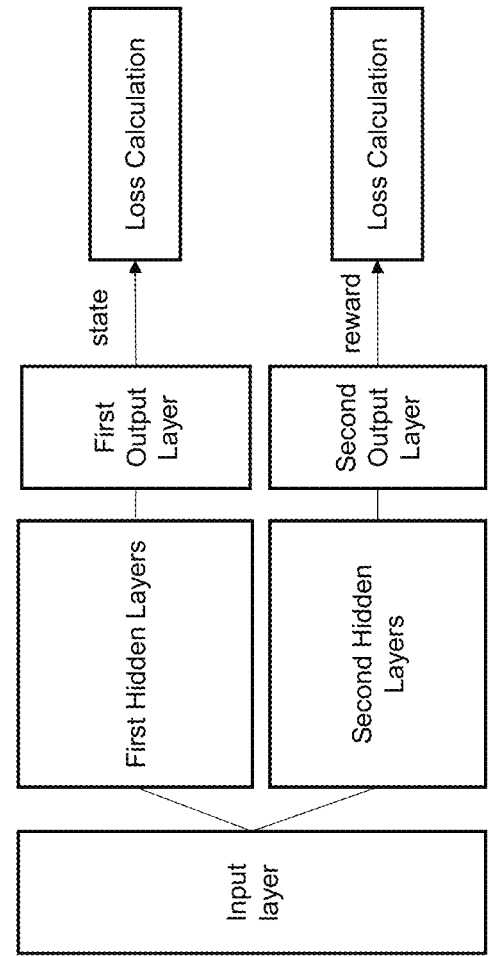

FIGS. 3A and 3B are diagrams illustrating a structure of a teacher model according to various embodiments of the present disclosure.

As shown in FIG. 3A, a teacher model may include an input layer, hidden layers, a first output layer configured to output a predicted state, and a second output layer configured to output a predicted reward. In order to train the teacher model, a state transition model loss is computed based on a difference between the predicted state and a ground-truth state, and a reward transition model loss is computed based on a difference between the predicted reward and a ground-truth reward, and an overall loss that combines the state transition model loss and the reward transition model loss is back-propagated to update network parameters of the hidden layers.

Referring to FIG. 3B, a teacher model may include an input layer, first hidden layers, second hidden layers, a first output layer connected to the first hidden layers and configured to output a predicted state, and a second output layer connected to the second hidden layers and configured to output a predicted reward. Unlike the network structure having shared hidden layers as illustrated in FIG. 3A, the network structure shown in FIG. 3B has two separate hidden layers for predicting a state and a reward, respectively. In order to train the teacher model of FIG. 3B, a state transition model loss is computed based on a difference between the predicted state and a ground-truth state and the state transition model loss is back-propagated to update network parameters of the first hidden layers. Additionally, a reward transition model loss is computed based on a difference between the predicted reward and a ground-truth reward, and the reward transition model loss is back-propagated to update network parameters of the second hidden layers. Although FIG. 3B illustrates that the input layer is shared with the first hidden layers and the second hidden layers, the embodiments are not limited thereto and two separate input layers may be provided. Also, student models according to embodiments of the present disclosure may have the same or substantially the same network structure as illustrated in FIG. 3A or FIG. 3B.

Figure 3C:
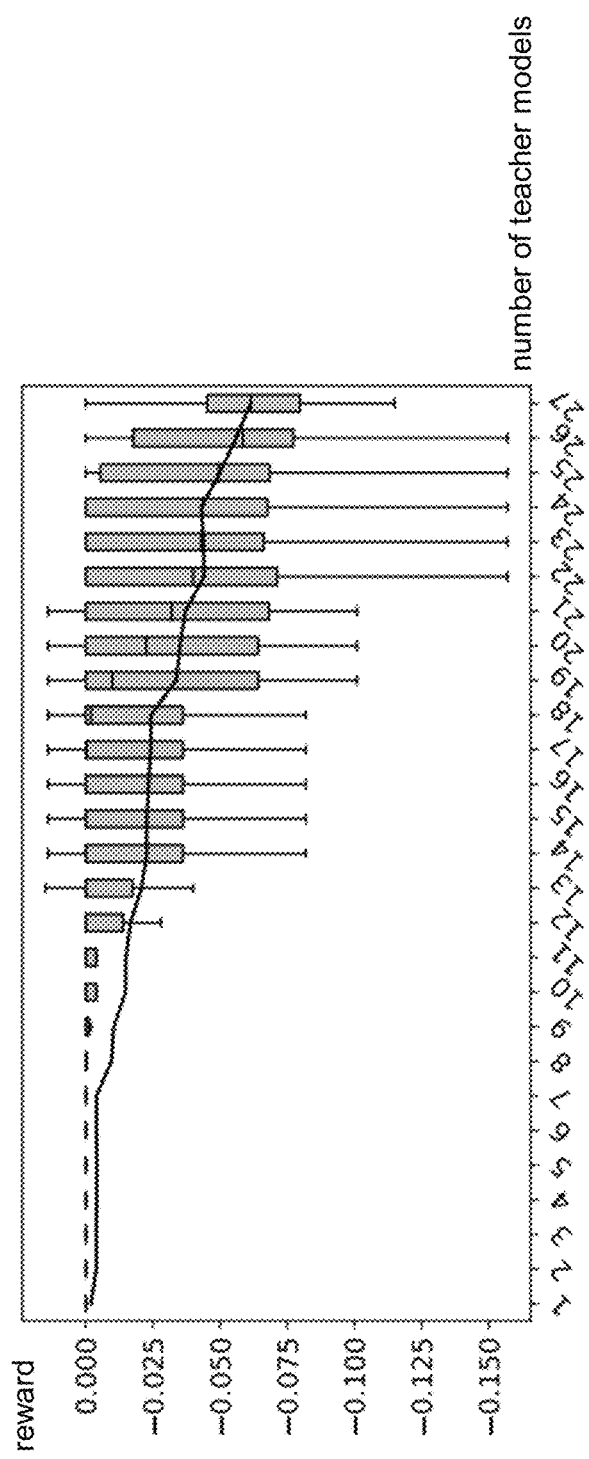
FIG. 3C is a graph showing a relationship between a reward and the number of teacher models that transfer knowledge to student models according to embodiments of the present disclosure.

FIG. 3C is a graph showing a relationship between a reward and the number of teacher models according to embodiments of the present disclosure.

As shown in FIG. 3, a reward tends to decrease from a certain point as the number of teacher models increases. Based on experiments, the number of teacher models may be set to have a number in a range from four to eight. For example, six teacher models may be used in transferring knowledge to the student models to avoid the decrease in reward.

Figure 4:
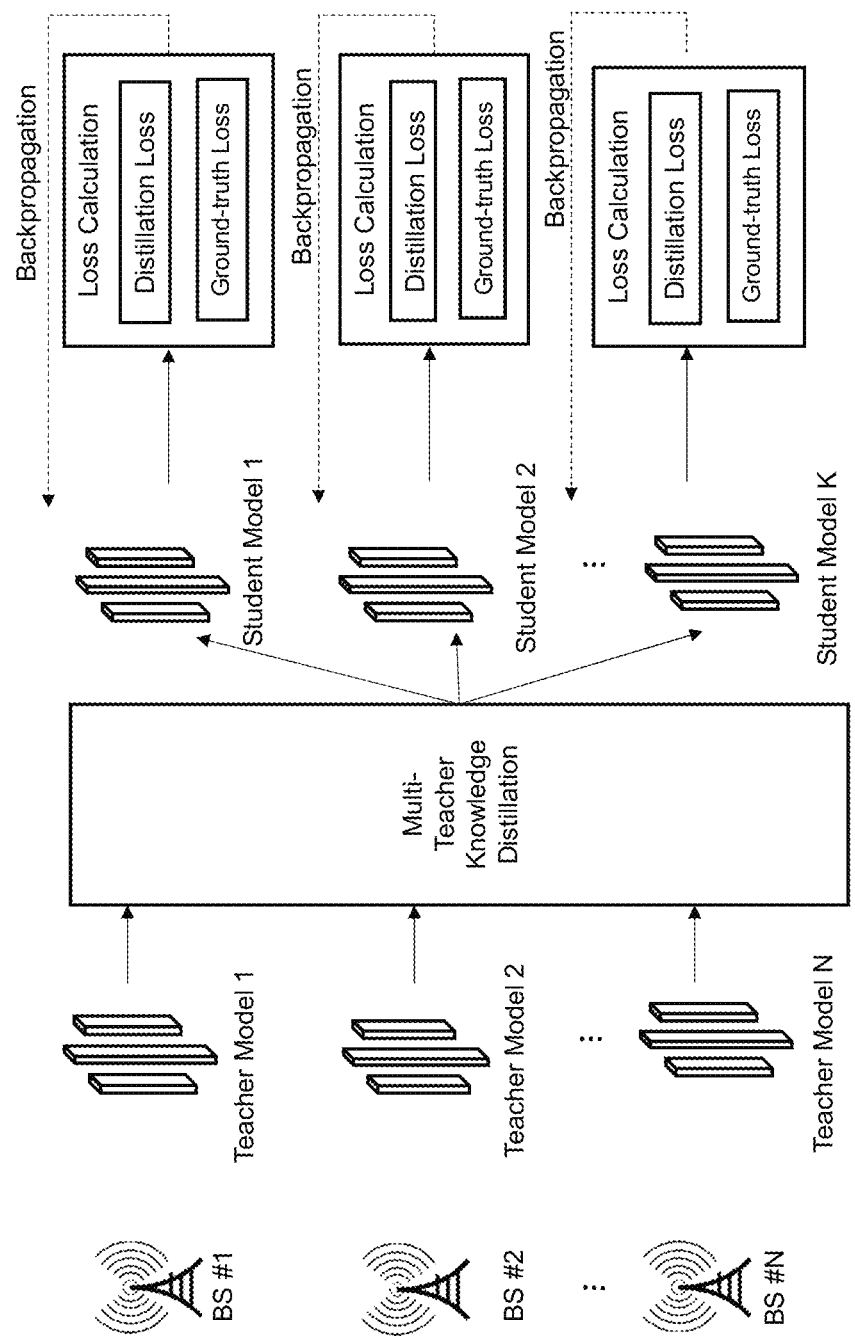
FIG. 4 is a diagram illustrating a method of training student models according to embodiments of the present disclosure.

FIG. 4 is a diagram illustrating a method of training student models according to embodiments of the present disclosure.

As shown in FIG. 4, the server 120 may utilize a plurality of teacher models 1-N and a plurality of student models 1-K. The predictions of the plurality of teacher models 1-N may be integrated and then transferred to each of the plurality of student models 1-K. For example, an average value of the predictions of the plurality of teacher models 1-N may be provided to each of the plurality of student models 1-K.

Each of the plurality of student models 1-K may compute a student loss that combines a distillation loss and a ground-truth loss. The distillation loss may represent a difference between a teacher prediction (e.g., the average value of the predictions of the plurality of teacher models 1-N) and a student prediction of the student model. The ground-truth loss may represent a difference between the student prediction and a ground-truth value.

When the teacher models 1-N and the student models 1-K are constituted with a state transition model and a reward transition model, the teacher prediction may include a teacher predicted state and a teacher predicted reward, and the student prediction may include a student predicted state and a student predicted reward. The ground-truth value may include a ground-truth state and a ground-truth reward. In that case, the distillation loss may represent each or a combination of a difference between the teacher predicted state and the student predicted state, and a difference between the teacher predicted reward and the student predicted reward. The ground-truth loss may represent each or a combination of a difference between the student predicted state and the ground-truth state and a difference between the student predicted reward and the ground-truth reward.

In computing the distillation loss, any one or any combination of a Kullback-Leibler (KL) divergence loss function, a negative log likelihood loss function, and a mean squared error loss function may be used.

According to embodiments of the disclosure, the number of student models may be determined to achieve a balance between a performance of an ensemble student model and a computational cost caused by the number of the student models. The performance of the ensemble student model increases in proportion to the number of student models. However, when the number of the student models reaches a certain number, the performance improvement becomes marginal, whereas the computational cost continues to increase in proportion to the number of student models. Based on an evaluation with different numbers of student models, the number of student models may be set to have a number in a range from two to six. For example, three student models may be used to obtain an ensemble student model, but the embodiments are not limited thereto.

Figure 5:
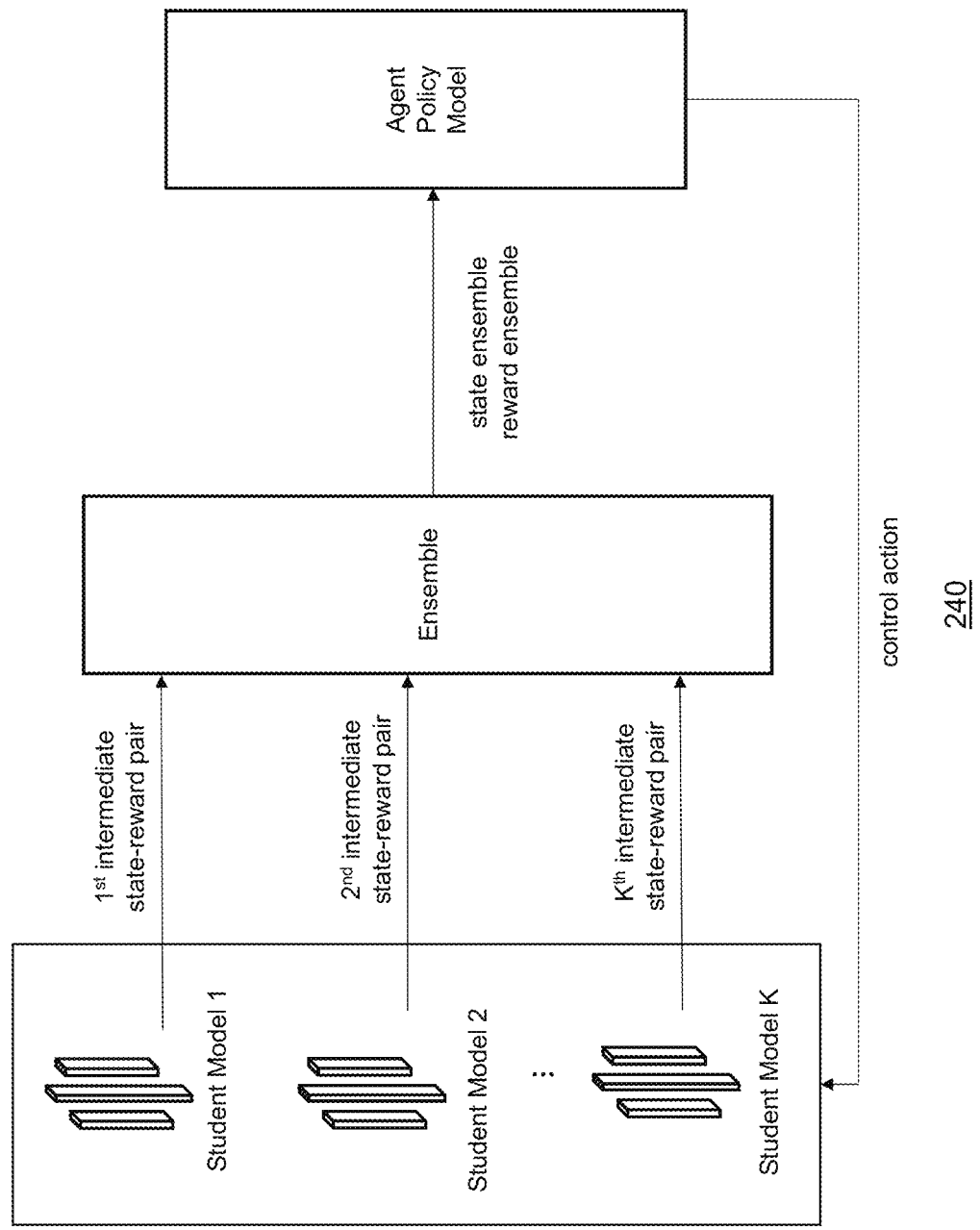
FIG. 5 is a diagram illustrating a method of combining student models to obtain an ensemble student model according to embodiments of the present disclosure.

FIG. 5 is a diagram illustrating a method of combining student models to obtain an ensemble student model for a policy rehearsal according to embodiments of the present disclosure.

Referring to FIG. 5, once the student models 1-K are trained in operation 230 of FIG. 4, a first intermediate state-reward pair, a second intermediate state-reward pair, and a $K^{th}$ intermediate state-reward pair are obtained from the student models 1-K, respectively, in operation 240. In turn, an ensemble algorithm may be applied to combine the first intermediate state-reward pair, the second intermediate state-reward pair, and the $K^{th}$ intermediate state-reward pair. For example, an average of all intermediate state values, and an average of all intermediate reward values may be computed as a state ensemble and a reward ensemble, respectively. The state ensemble and the reward ensemble may input an agent policy model which applies a policy learning algorithm, such as Proximal Policy Optimization (PPO), Deep Deterministic Policy Gradient (DDPG), Twin-delayed DDPG, or Soft Actor-Critic (SAC), to learn and update a control policy. The agent policy model may be trained to minimize or converge a policy rehearsal loss, which decreases as the predicted return expressed in Equation (5) increases.

The combination of the student models 1-K with the ensemble algorithm may be considered as an ensemble student model.

Figure 6:
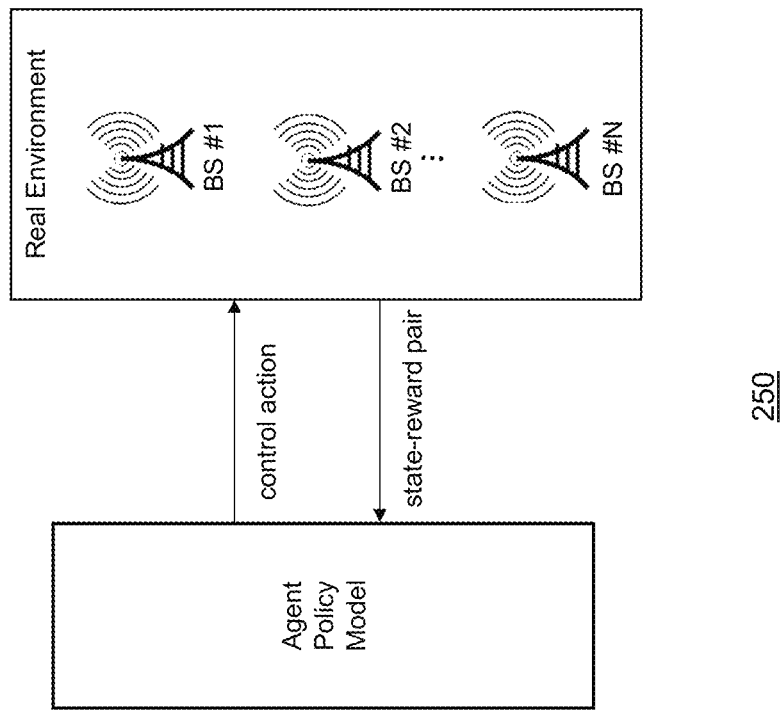
FIG. 6 is a diagram illustrating a method of evaluating a policy model according to embodiments of the present disclosure.

FIG. 6 is a diagram illustrating a method of evaluating a policy model according to embodiments of the present disclosure.

Referring to FIG. 6, once the training of the agent policy model is completed via the policy rehearsal in operation 240 of FIG. 5, the agent policy model may provide a control action (e.g., a control action for adjusting traffic load parameters of base stations) to the real environment including the base stations BS #1-BS #N and may obtain a state-reward pair (e.g., a communication system state indicting an average number of active UEs per cell, an average bandwidth utilization per cell, an average IP throughput per cell, and a reward indicating a minimum IP throughput) via observation of the base stations BS #1-BS #N, in operation 250.

Based on the observation, the server 120 may determine whether the new control policy applied to the agent policy model provides a higher performance than an old control policy. For example, the server 120 may compare a return of the new control policy with a return of the old control policy, and may determine the new control policy stops improving when the return of the new control policy is less than the return of the old control policy by a predetermined margin or more. When the new control policy is determined not to improve any longer, the server 120 may stop the policy learning process.

Figure 7:
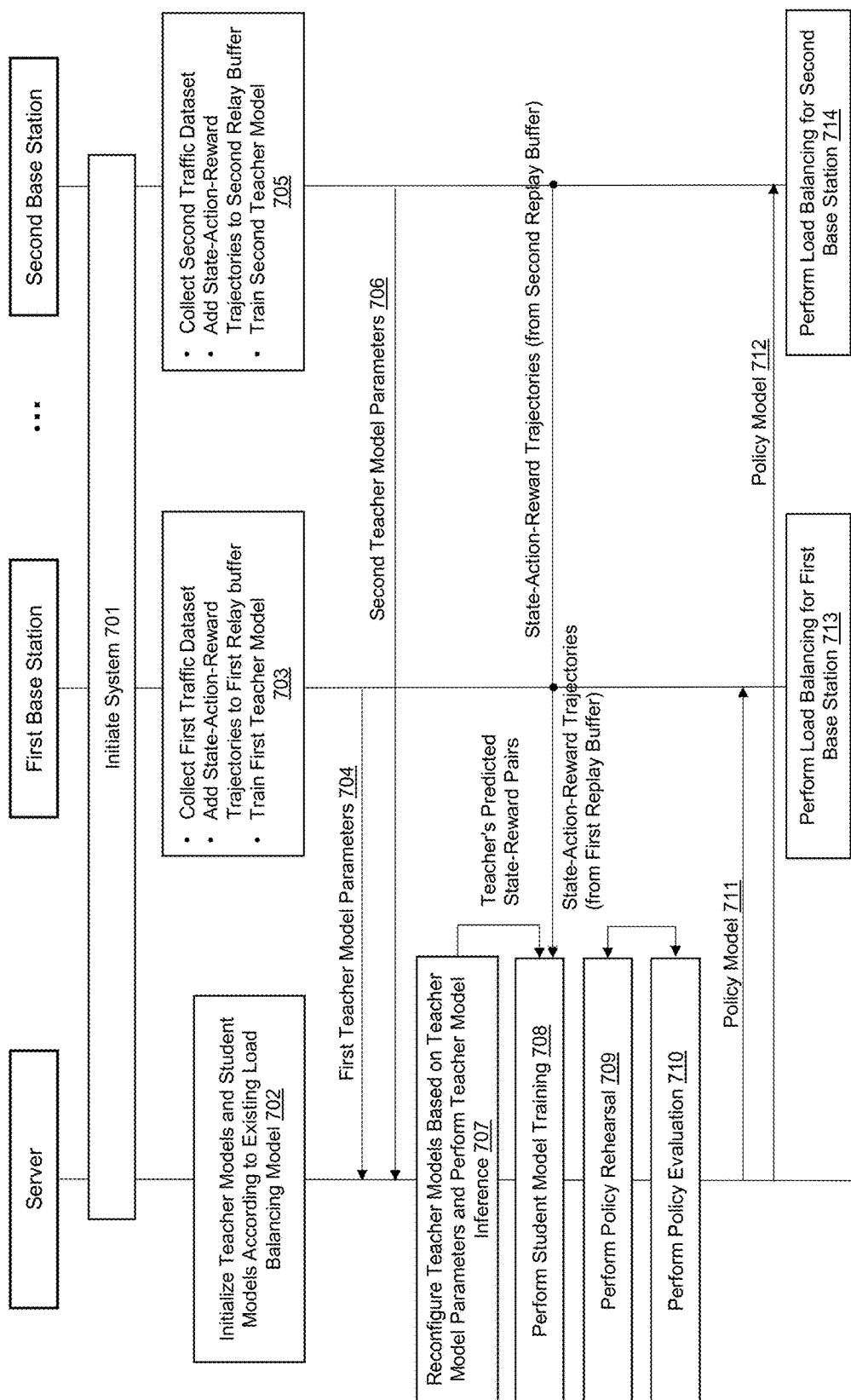
FIG. 7 is a flowchart illustrating a method of performing traffic load balancing according to embodiments of the present disclosure.

FIG. 7 is a flowchart illustrating a method of performing traffic load balancing according to embodiments of the present disclosure.

In operation 701, a system including a server and a plurality of base stations are initiated.

In operation 702, the server initializes teacher models and student models according to an existing load balancing model or an existing control policy, so that the teacher models and the student models may be set up with an initialized set of model parameters.

In operations 703 and 705, each base station may collect its own local traffic dataset, sample state-action-reward trajectories from the traffic data set, add the sampled state-action-reward trajectories to its local relay buffer, and train a teacher model using the state-action-reward trajectories. Operations 703 and 705 may correspond to operations 210 and 220 illustrated in FIG. 2.

In operations 704 and 706, when each of the base stations finishes training its teacher model, each of the base stations may transmit model parameters of the teacher model to the server.

In operation 707, the server may update the initialized teacher models based on the teacher model parameters transmitted from the base stations, and perform a teacher model interface to obtain teacher's predicted state-reward pairs as outputs of the teacher models.

In operation 708, the server may train the student models based on the teacher's predicted state-reward pairs and the state-action-reward trajectories provided from each of the base stations. For example, the server may compute a distillation loss that represents a difference between a prediction of the teacher models and a prediction of each of the student models, and a ground-truth loss that represents a difference between the prediction of each of the student models and a ground-truth value, and may train each of the student models to minimize or converge a sum of the distillation loss and the ground-truth loss. The server may use Equation (2) to compute the distillation loss and the ground-truth value. Operation 708 may correspond to operation 230 illustrated in FIGS. 2 and 4.

In operation 709, the server may perform a policy rehearsal on an ensemble of the student models. The ensemble of the student models may be obtained by computing an average of predicted states of the student models as a state ensemble, computing an average of predicted rewards of the student models as a reward ensemble, and providing the state ensemble and the reward ensemble rewards to an agent policy model to obtain an updated state ensemble and an update reward ensemble via an iteration process. For example, the server may use Equations (3) and (4) to compute the state ensemble and the reward ensemble, respectively, and perform the iteration process until a predicted reward of the agent policy model is maximized, for example using Equation (5). Operation 709 may correspond to operation 240 illustrated in FIGS. 2 and 5.

In operation 710, the server may perform a policy evaluation to determine whether a new control policy applied by the ensemble student model to an agent policy model continues to improve, in comparison with the performance of an old control policy. When a return of the new control policy is less than a return of the old control policy by a predetermined marine or more, the new control policy is determined not to improve any longer and therefore the policy learning is terminated. Operation 710 may correspond to operation 250 illustrated in FIGS. 2 and 6.

In operations 711 and 712, after the policy learning is completed, the server may transmit the new control policy to each of the base stations.

In operations 713 and 714, each of the base stations may perform a traffic load balancing operation based on the new control policy.

Figure 8:
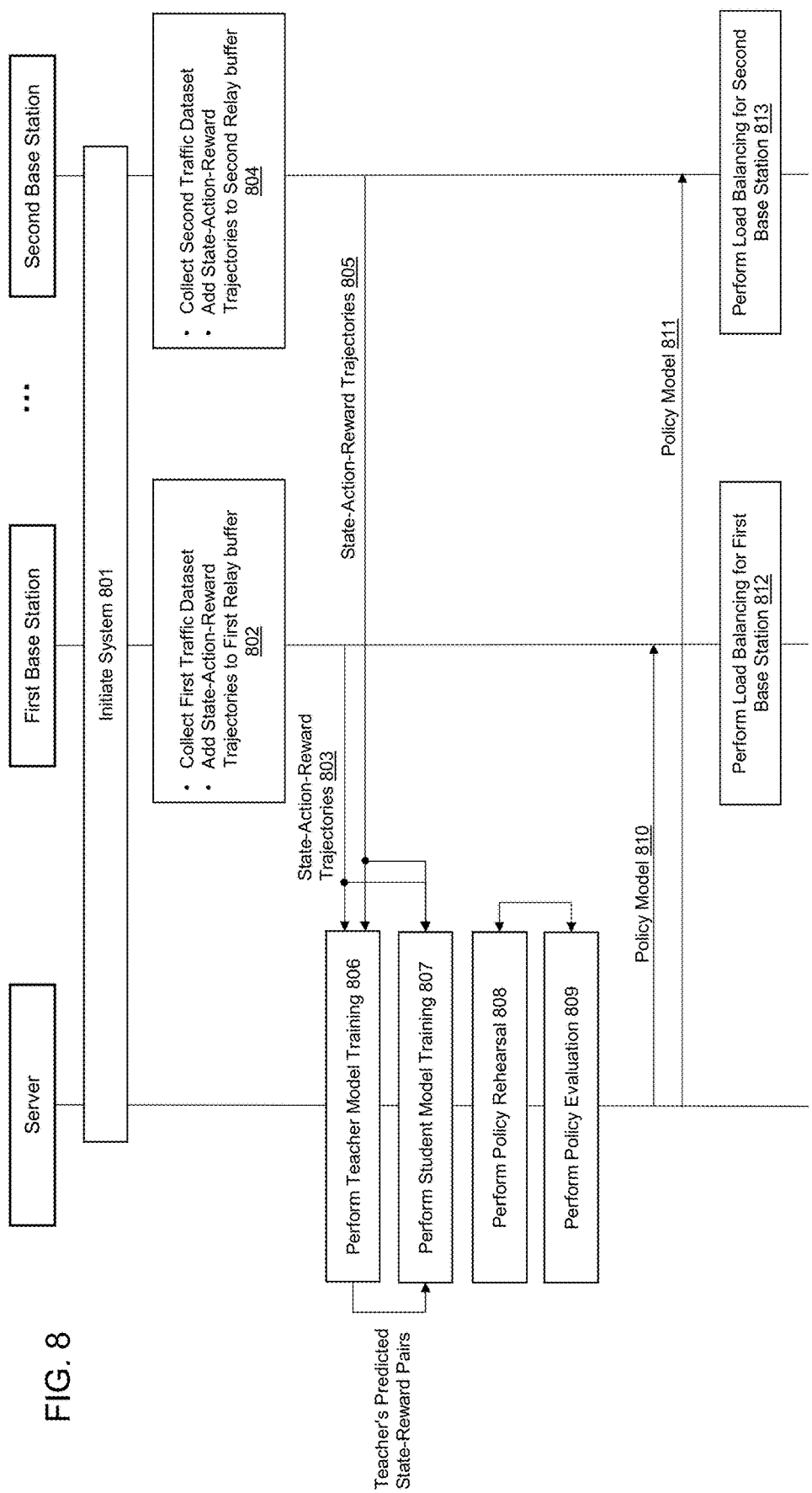
FIG. 8 is a flowchart illustrating another method of performing traffic load balancing according to embodiments of the present disclosure.

FIG. 8 is a flowchart illustrating another method of performing traffic load balancing according to embodiments of the present disclosure.

Operations 801 and 807-813 may be performed in the same or substantially the same manner as operations 701 and 708-714, and therefore duplicate description will be omitted for conciseness.

In operation 802 and 804, each base station may not train its own teacher model, and instead, may transmit the state-action-reward trajectories that are sampled from its replay buffer to the server, in operations 803 and 805.

In operation 806, the server may train the teacher models based on the state-action-reward trajectories received from each of the base stations, so as to transfer knowledge of the teacher models to the student models.

As such, the training of the teacher models may be performed in each of the base stations as shown in FIG. 7, or alternatively, may be performed in the server as shown in FIG. 8.

Figure 9:
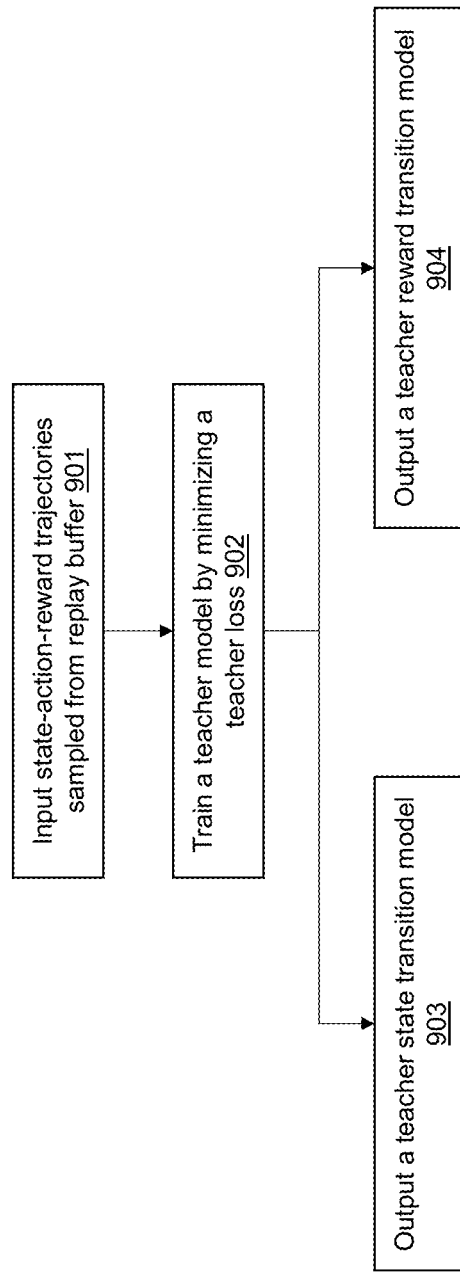
FIG. 9 is a flowchart illustrating a method of training teacher models according to embodiments of the present disclosure.

FIG. 9 is a flowchart illustrating a method of training teacher models according to embodiments of the present disclosure. FIG. 9 illustrates a method of training a single teacher model, but the method may be applied to each of a plurality of teacher models in the same or substantially the same manner.

In operation 901, state-action-reward trajectories that are sampled from a replay buffer may be input to a teacher model.

In operation 902, the teacher model may be trained to minimize or converge a teacher loss. The teacher loss may include a state transition model loss representing a difference between a predicted next state of the teacher model and a ground-truth next state, and a reward transition model loss representing a difference between a predicted reward of the teacher model and a ground-truth reward. The teacher loss, the state transition model loss, and the reward transition model loss may be computed using Equation (1).

In operation 903, a state transition model of the teacher model is obtained by minimizing or converging the state transition model loss or the teacher loss.

In operation 904, a reward transition model of the teacher model is obtained by minimizing or converging the reward transition model loss or the teacher loss.

Figure 10:
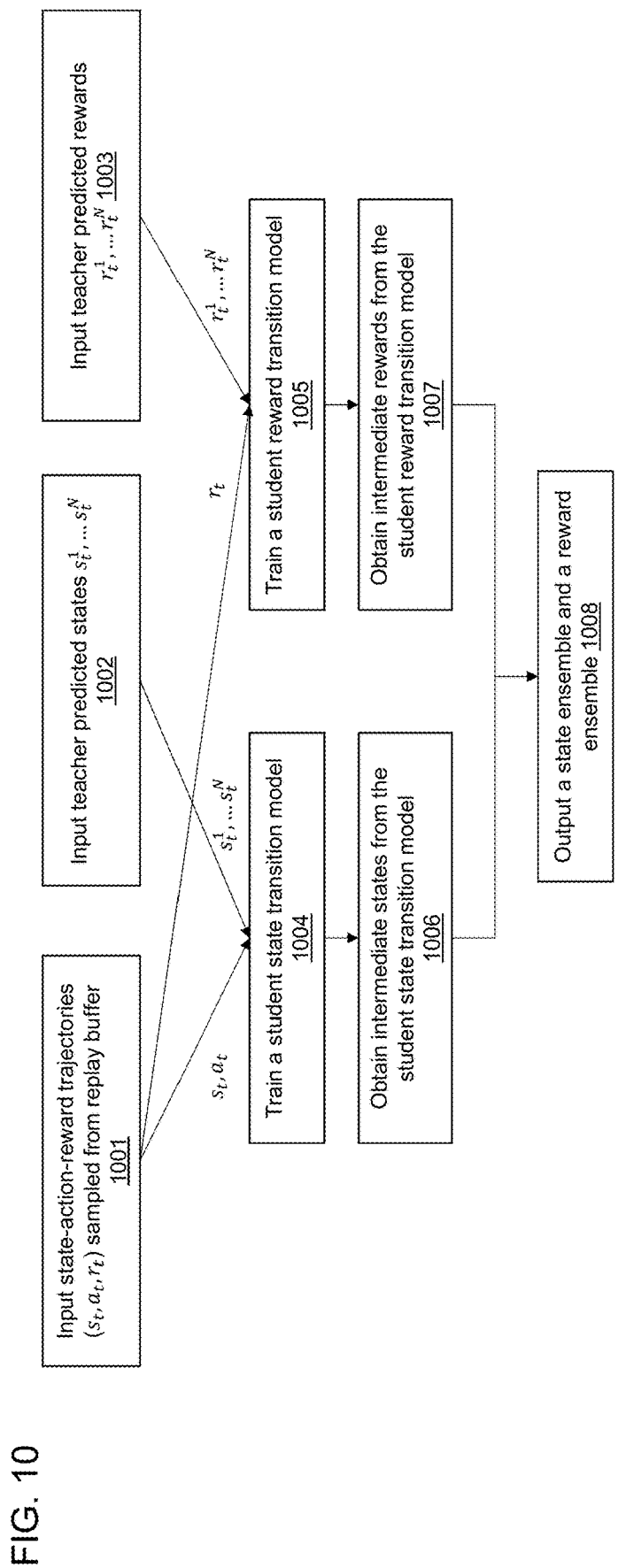
FIG. 10 is a flowchart illustrating a method of training student models and obtaining an ensemble student model according to embodiments of the present disclosure.

FIG. 10 is a flowchart illustrating a method of training student models and obtaining an ensemble student model according to embodiments of the present disclosure.

In operation 1001, state-action-reward trajectories ($s_t$, $a_t$, $r_t$) that are sampled from a replay buffer, may be input to a student model.

In operation 1002, teacher predicted states ($s_t^1$, $s_t^2$ ..., $s_t^N$) that are output from each of the state transition models of the teacher models 1-N, may be input to the student model.

In operation 1003, teacher predicted rewards ($r_t^1$, $r_t^2$ ..., $r_t^N$) that are output from each of the reward transition models of the teacher models 1-N, may be input to the student model.

In operation 1004, a state transition model of the student model may be trained using the state-action pairs ($s_t$, $a_t$) sampled from the replay buffer and the teacher predicted states ($s_t^1$, $s_t^2$ ..., $s_t^N$) until a state transition model loss of the student model is minimized or converges. The state transition model loss may be computed using Equation (2).

In operation 1005, a reward transition model of the student model may be trained using the reward ($r_t$) sampled from the replay buffer and the teacher predicted rewards ($r_t^1$, $r_t^2$ ..., $r_t^N$) until a reward transition model loss of the student model is minimized or converges. The reward transition model loss may be computed using Equation (2).

Each of a plurality of student models may be trained via operations 1001-1005. Operations 1001-1005 may correspond to operation 230 illustrated in FIGS. 2 and 3.

In operation 1006, intermediate states are obtained from the state transition models of the plurality of student models.

In operation 1007, intermediate rewards are obtained from the reward transition models of the plurality of student models.

In operation 1008, a state ensemble may be obtained by averaging the intermediate states, and a reward ensemble may be obtained by averaging the intermediate rewards.

Figure 11:
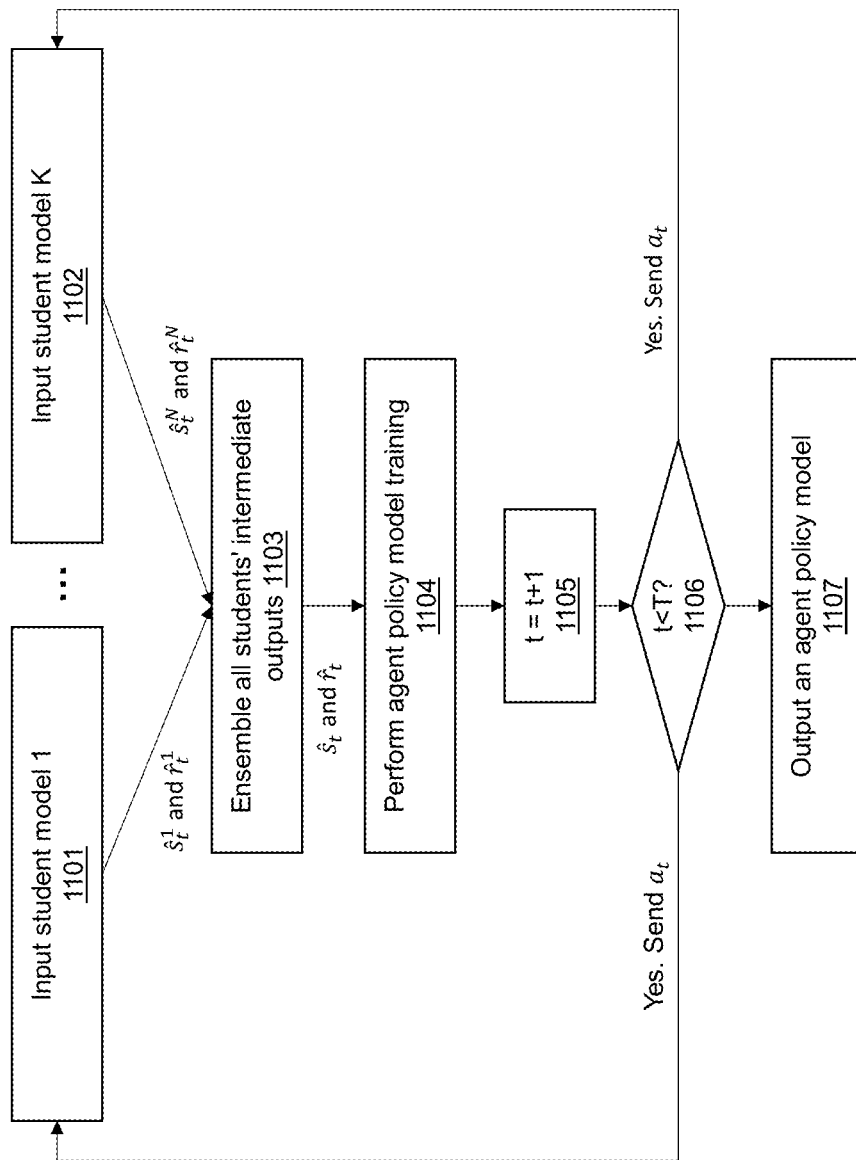
FIG. 11 is a flowchart illustrating a method of performing a policy rehearsal according to embodiments of the present disclosure.

FIG. 11 is a flowchart illustrating a method of performing a policy rehearsal according to embodiments of the present disclosure.

The method of performing a policy rehearsal may include operations 1101-1107.

In operations 1101 and 1102, a plurality of student models 1-K are obtained via knowledge distillation from a plurality of teacher models.

In operation 1102, intermediate state-reward pairs ($\hat{s}_t^1$ and $\hat{r}_t^1$, $\hat{s}_t^2$ and $\hat{r}_t^2$, ..., and $\hat{s}_t^N$ and $\hat{r}_t^N$) are obtained from the outputs of the plurality of student models 1-K.

In operation 1103, all the intermediate states are combined as an state ensemble $\hat{s}_t$, and all the intermediate rewards are combined as a reward ensemble $\hat{r}_t$. The state ensemble $\hat{s}_t$ and the reward ensemble $\hat{r}_t$ may be computed using Equations (3) and (4).

In operation 1104, an agent policy model may be trained using the state ensemble $\hat{s}_t$ and the reward ensemble $\hat{r}_t$, to maximize a predicted return via a policy gradient method. At each iteration time step, policy parameters may be updated as follows:

$$\theta_{k+1} = \arg\max_\theta \frac{1}{|D_k|T} \qquad (8)$$

$$\sum_{\tau \in D_k} \sum_{t=0}^{T} \min\left(\frac{\pi_\theta(a_t \mid s_t)}{\pi_{\theta_k}(a_t \mid s_t)} A^{\pi_{\theta_k}}(s_t, a_t), g(\epsilon, A^{\pi_{\theta_k}}(s_t, a_t))\right)$$

Where $\theta_{k+1}$ denotes updated parameters at iteration time step k+1, k denotes an iteration time step, $\pi_{\theta_k}$ denotes a policy parameterized by parameters $\theta_k$, and $\pi_{\theta_{k+1}}$ denotes a policy parameterized by parameters $\theta_{k+1}$. In other words, $\pi_{\theta_{k+1}}$ represents a new control policy that is updated from the current control policy $\pi_{\theta_k}$. "min" denotes a minimum function which chooses the lowest value among the components of the minimum function, and "A" denotes an advantage function, which is expressed as $A^\pi(s_t, a_t) = Q^\pi(s_t, a_t) - V^\pi(s_t)$, wherein $Q^\pi(s_t, a_t)$ refers to an active-value function that shows an expected return when an action a is take in a certain state s, and $V^\pi(s_t)$ refers to a state-value function that shows an expected return for selecting a certain state s. g ($\epsilon$, A) may be expressed as Equation (9):

$$g(\epsilon, A) = \begin{cases} (1+\epsilon)A & A \geq 0 \\ (1-\epsilon)A & A < 0 \end{cases} \qquad (9)$$

After the training process of the agent policy model, an iteration time step t is increased by 1 in operation 1105, and it is determined whether the increased iteration time t is less than a predetermined number of iteration time steps T in operation 1106.

In operation 1106, when the increased iteration time t is less than the predetermined number of iteration time steps T, a control action $a_t$ that is output from the agent policy model is provided to each of the student models 1-K to repeat operations 1101-1106 until the iteration time step t reaches the predetermined number of iteration time steps T.

When the iteration time step t teaches the predetermined number of iteration time steps T, the policy rehearsal is terminated and the agent policy model is output, in operation 1107.

Operations 1011-1107 may correspond to operation 240 illustrated in FIGS. 2 and 5.

Figure 12:
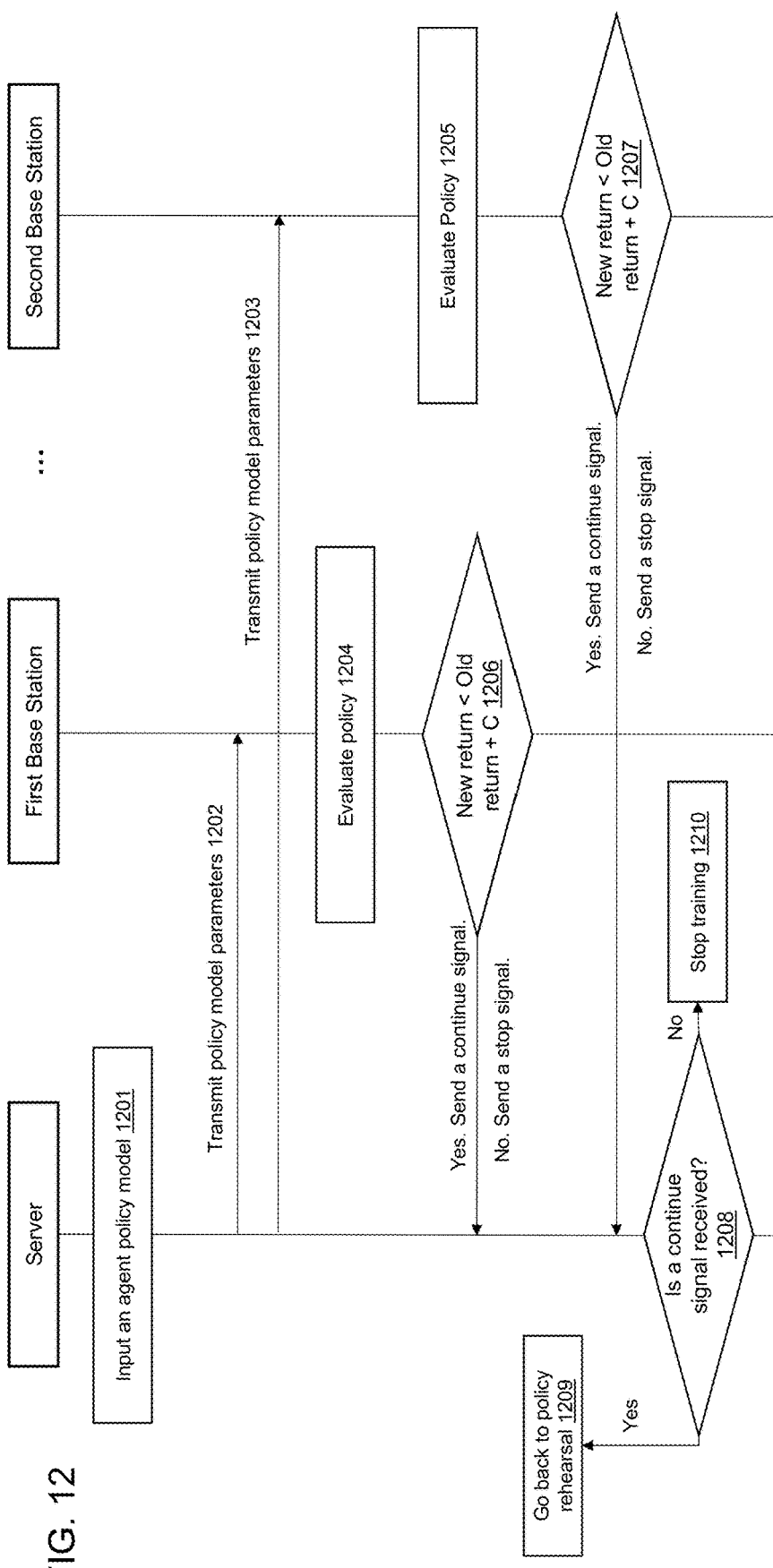
FIG. 12 is a flowchart illustrating a method of performing a policy evaluation according to embodiments of the present disclosure.

FIG. 12 is a flowchart illustrating a method of performing a policy evaluation according to embodiments of the present disclosure.

The method of performing a policy evaluation may include operations 1201-1210.

In operation 1201, a server may input an agent policy model that is trained via operations 240 illustrated in FIG. 2 or operations 1011-1107 illustrated in FIG. 11.

In operations 1201 and 1203, the server may transmit model parameters of the agent policy model to each of a plurality of base stations.

In operations 1204 and 1205, each of the plurality of base stations may evaluate a new control policy provided from the agent policy model, in comparison with an old control policy.

In operations 1206 and 1207, each base station determines whether a return of the new control policy is less than a return of the old control policy by a predetermined margin C or more. If the return of the new control policy is less than the return of the old control policy by the predetermined margin C or more, the base station(s) transmits feedback information such as a training continue signal, and otherwise, sends a training stop signal or does not send any signal. The feedback information may provide information about an evaluation result of the new control policy in comparison with the old control policy, for example, information about whether the return of the new control policy is less than the return of the old control policy by the predetermined margin C or more.

In operation 1208, when the server receives a training continue signal from any of the base stations, the server performs a policy rehearsal process in operation 1209. When the server receives a training stop signal or alternatively, does not receive a training continue signal, the server stops the policy rehearsal process in operation 1210.

Operations 1201-1209 may correspond to operation 250 illustrated in FIGS. 2 and 6.

Figure 13:
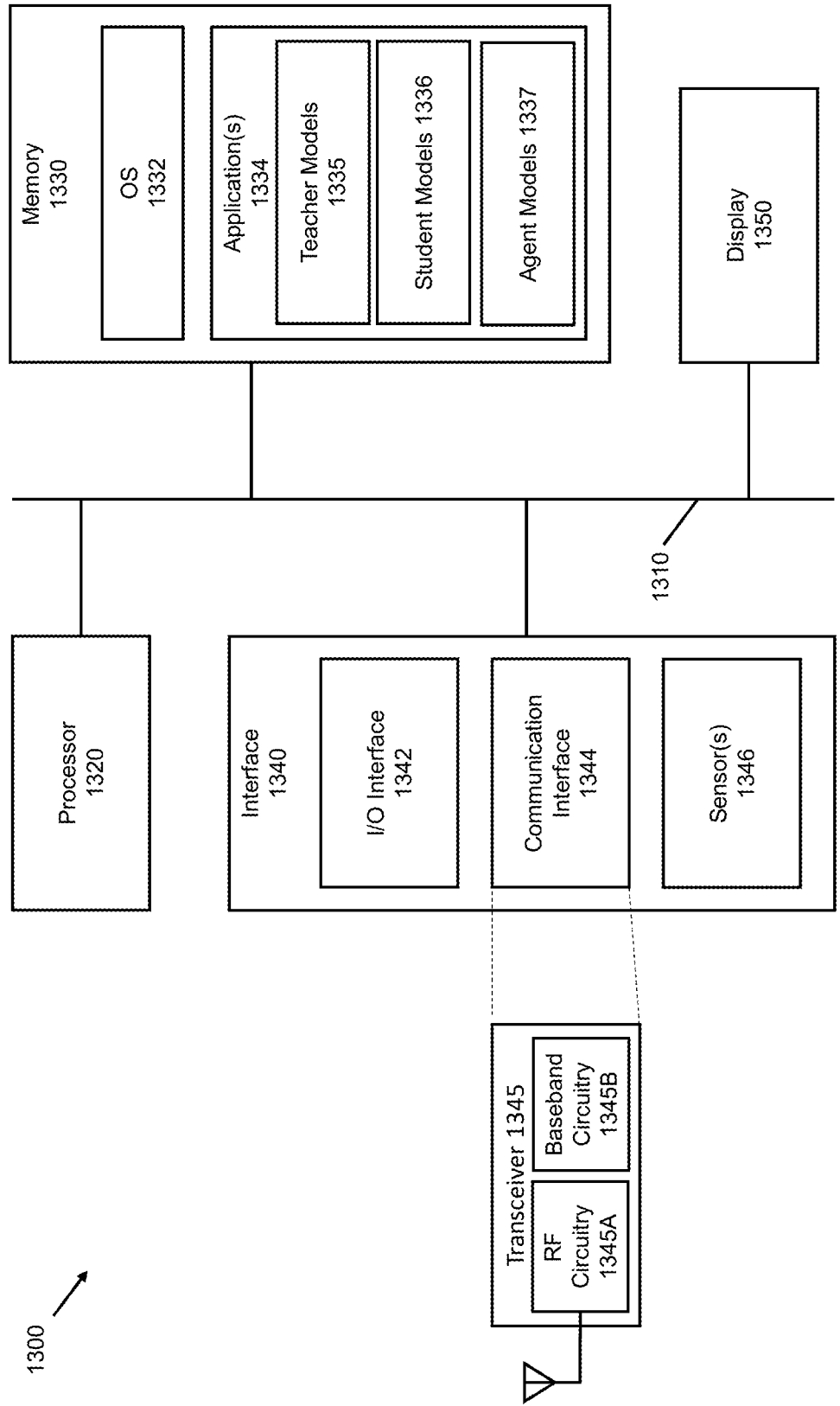
FIG. 13 is a block diagram of an electronic device according to embodiments of the present disclosure.

FIG. 13 is a block diagram of an electronic device 1300 according to embodiments.

FIG. 13 is for illustration only, and other embodiments of the electronic device 1300 could be used without departing from the scope of this disclosure. For example, the electronic device 1300 may correspond to the server 120.

The electronic device 1300 includes a bus 1010, a processor 1320, a memory 1330, an interface 1340, and a display 1350.

The bus 1010 includes a circuit for connecting the components 1320 to 1350 with one another. The bus 1010 functions as a communication system for transferring data between the components 1320 to 1350 or between electronic devices.

The processor 1320 includes one or more of a central processing unit (CPU), a graphics processor unit (GPU), an accelerated processing unit (APU), a many integrated core (MIC), a field-programmable gate array (FPGA), or a digital signal processor (DSP). The processor 1320 is able to perform control of any one or any combination of the other components of the electronic device 1300, and/or perform an operation or data processing relating to communication. For example, the processor 1320 performs operations 210-250 illustrated in FIG. 2, and operations 702 and 707-712 illustrated in FIG. 7, operations 901-904 illustrated in FIG. 9, operations 1001-1008 illustrated in FIG. 10, operations 1101-1107 illustrated in FIG. 11, and operations 1201-1203 and 1208-1210 illustrated in FIG. 12. The processor 1320 executes one or more programs stored in the memory 1330.

The memory 1330 may include a volatile and/or non-volatile memory. The memory 1330 stores information, such as one or more of commands, data, programs (one or more instructions), applications 1334, etc., which are related to at least one other component of the electronic device 1300 and for driving and controlling the electronic device 1300. For example, commands and/or data may formulate an operating system (OS) 1332. Information stored in the memory 1330 may be executed by the processor 1320.

In particular, the memory 1330 stores data, computer-readable instructions, applications, and setting information for the operation of base stations of the communication system 110. The memory 1330 may store information on a bearer allocated to an accessed UE and a measurement result reported from the accessed UE.

The applications 1334 include the above-discussed embodiments. These functions can be performed by a single application or by multiple applications that each carry out one or more of these functions. For example, the applications 1334 may include artificial intelligence (AI) models for performing operations 210-250 illustrated in FIG. 2, and operations 702 and 707-712 illustrated in FIG. 7, operations 901-904 illustrated in FIG. 9, operations 1001-1008 illustrated in FIG. 10, operations 1101-1107 illustrated in FIG. 11, and operations 1201-1203 and 1208-1210 illustrated in FIG. 12. Specifically, the applications 1334 may include teacher models 1334, student models 1336, and an agent policy model 1337 according to embodiments of the disclosure.

The display 1350 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display.

The interface 1340 includes input/output (I/O) interface 1342, communication interface 1344, and/or one or more sensors 1346. The I/O interface 1342 serves as an interface that can, for example, transfer commands and/or data between a user and/or other external devices and other component(s) of the electronic device 1300.

The communication interface 1344 may include a transceiver 1345 to enable communication between the electronic device 1300 and other external devices (e.g., a plurality of base stations, and other servers that may store teacher models), via a wired connection, a wireless connection, or a combination of wired and wireless connections. The communication interface 1344 may permit the electronic device 1300 to receive information from another device and/or provide information to another device. For example, the communication interface 1344 may include an Ethernet interface, an optical interface, a coaxial interface, an infrared interface, a radio frequency (RF) interface, a universal serial bus (USB) interface, a Wi-Fi interface, a cellular network interface, or the like.

The transceiver 1345 of the communication interface 1344 may include a radio frequency (RF) circuitry 1345A and a baseband circuitry 1345B.

The baseband circuitry 1345B may transmit and receive a signal through a wireless channel, and may perform band conversion and amplification on the signal. The RF circuitry 1345A may up-convert a baseband signal provided from the baseband circuitry 1345B into an RF band signal and then transmits the converted signal through an antenna, and down-converts an RF band signal received through the antenna into a baseband signal. For example, the RF circuitry 1345A may include a transmission filter, a reception filter, an amplifier, a mixer, an oscillator, a digital-to-analog converter (DAC), and an analog-to-digital converter (ADC).

The transceiver 1345 may be connected to one or more antennas. The RF circuitry 1345A of the transceiver 1345 may include a plurality of RF chains and may perform beamforming. For the beamforming, the RF circuitry 1345A may control a phase and a size of each of the signals transmitted and received through a plurality of antennas or antenna elements. The RF circuitry 1345A may perform a downlink multi-input and multi-output (MIMO) operation by transmitting one or more layers.

The baseband circuitry 1345A may perform conversion between a baseband signal and a bitstream according to a physical layer standard of the radio access technology. For example, when data is transmitted, the baseband circuitry 1345B generates complex symbols by encoding and modulating a transmission bitstream. When data is received, the baseband circuitry 1345B reconstructs a reception bitstream by demodulating and decoding a baseband signal provided from the RF circuitry 1345A.

The sensor(s) 1346 of the interface 1340 can meter a physical quantity or detect an activation state of the electronic device 1300 and convert metered or detected information into an electrical signal. For example, the sensor(s) 1346 can include one or more cameras or other imaging sensors for capturing images of scenes. The sensor(s) 1346 can also include any one or any combination of a microphone, a keyboard, a mouse, and one or more buttons for touch input. The sensor(s) 1346 can further include an inertial measurement unit. In addition, the sensor(s) 1346 can include a control circuit for controlling at least one of the sensors included herein. Any of these sensor(s) 1346 can be located within or coupled to the electronic device 1300.

Referring back to the processor 1320, the processor 1320 may transmit and receive signals through the RF circuitry 1345A and the baseband circuitry 1345B. The processor 1320 may record data (e.g., traffic data and/or model parameters) in the memory 1330 and read the data from the memory 1330.

For example, when the electronic device 1300 corresponds to the server 120, the processor 1320 may receive from a communication system 110, traffic data, such as information about a number of active UEs that are served by each cell of the base stations, a cell load ratio, and an internet protocol (IP) throughput per cell, and may store the information of the number of active UEs, the cell load ratio, and the PI throughput per cell, in the memory 1330. The processor 1320 may control the transceiver 1345 to transmit a request for traffic data to the communication system 110, and to receive from the server 120 the information of the number of active UEs, the cell load ratio, and the IP throughput per cell, in response to the request from the traffic data. The processor 1320 may perform operations 210-250 based on the communication system state information, and may transmit a control action for adjusting load balancing parameters of the base stations to the communication system 110. The communication system 110 may allocate communication bandwidth or UEs to the plurality of base stations of the communication system 110 or to the plurality of cells that are served by each of the base stations, according to a control action received from the server 120, so that traffic loads are distributed relatively evenly among the plurality of base stations, and/or among the plurality of cells of each base station.

Figure 14:
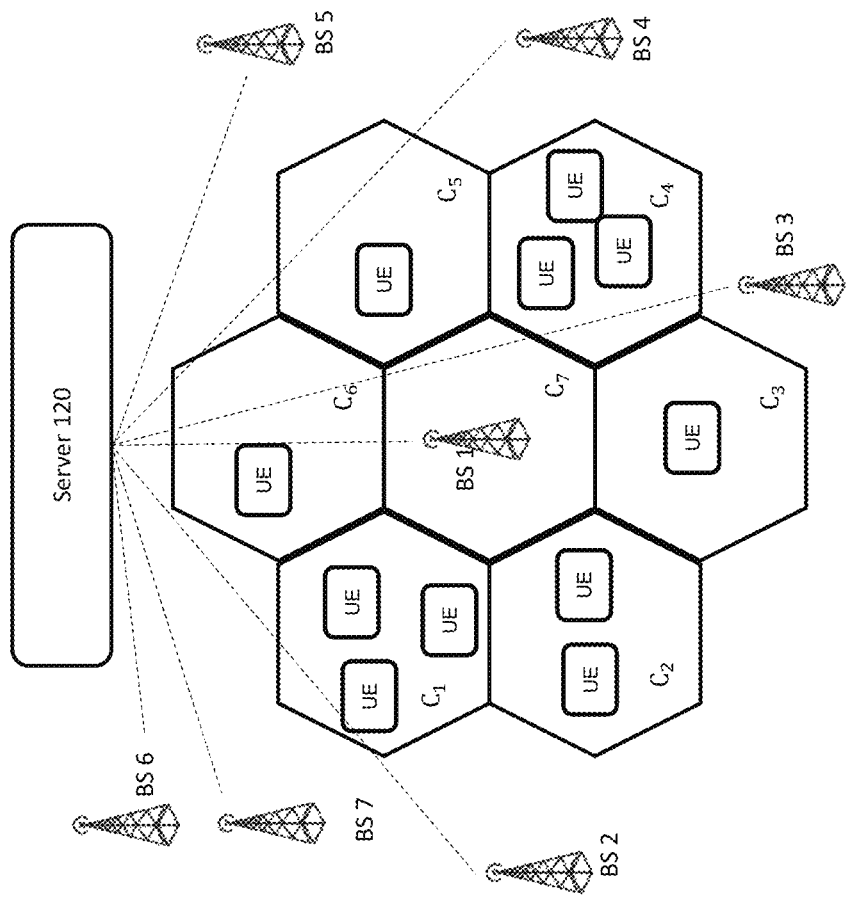
FIG. 14 illustrates a use application in which a server allocates a communication spectrum according to embodiments of the present disclosure.

FIG. 14 illustrates a use application in which a server performs traffic load balancing between different communication cells, according to embodiments.

Referring to FIG. 14, a system for performing traffic load balancing according to an example embodiment includes a server 120, a plurality of base stations BS1-BS7 each of which serves a plurality of cells having different cell reselection priorities, and a plurality of UEs that are respectively served in the plurality of cells.

In an example embodiment, a base station BS1 may serve a plurality of cells $C_1$-$C_7$ having different frequency bands $f_1$-$f_7$ and different cell reselection priorities.

The server 120 may communicate with the plurality of base stations BS1-BS7 to receive information about the state of the UEs in their serving cells, for example, whether the UEs are in an idle mode or an active mode, the number of active UEs, and an internet protocol (IP) throughput of each cell.

The server 120 may determine a cell reselection priority for each of the plurality of cells $C_1$-$C_7$ of the base station BS1 based on a control action provided from the server 120 via operations 210-250. For example, the server 120 may transmit a control action that adjusts the cell reselection priorities and/or the minimum IP throughput for each cell, to the base station BS1. Based on the control action, the base station BS1 may reassign some of the plurality of UEs to another cell to distribute traffic load among the plurality of cells C1-C7.

Figure 15:
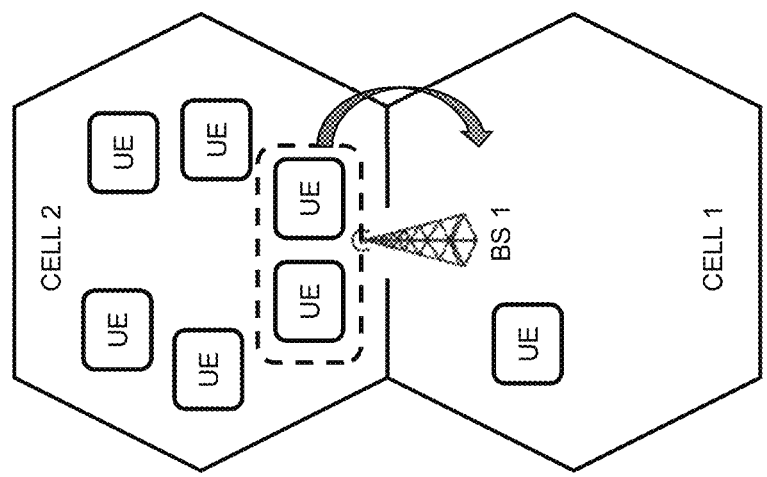
FIG. 15 illustrates a use application in which a server performs traffic load balancing between different communication cells, according to embodiments of the present disclosure.

FIG. 15 illustrates a cell reselection process according to an example embodiment.

As shown in FIG. 15, a communication system includes at least one base station (BS), a communication network, and a plurality of user equipment (UEs) that access the communication network through the at least one BS.

The at least one BS may correspond to an Evolved Node B (eNB), a Next Generation Node B (gNB), a 6G Node. The BS may collect status information of the UEs and may provide the UEs with access to the communication network based on the status information. Examples of the status information may include information of whether the UEs are in an active mode or an idle mode, and may also include a buffer status, an available transmission power status, and a channel status of each of the UEs.

The communication system provides a first cell Cell 1 and a second cell Cell 2, that are served by a base station BS1. For example, when six (6) UEs are connected to Cell 1 and one (1) cell is connected to Cell 2, one or more UEs among the six UEs in Cell 2 are reassigned to Cell 1 to distribute communication traffic load between Cell 1 and Cell 2, according to a control action provided from the server.

Specifically, in an LTE, a 5G system, or a 6G system, the base station BS1 may determine a cell reselection priority for each cell Cell 1 and Cell 2 to which the UEs should connect, through a radio resource control releasing message. The UEs may determine a target cell on which to camp based on the cell reselection priority. For each UE, the cell reselection process is performed as a probabilistic process based on the cell reselection priority. When Cell 1 has a high cell reselection priority, a given idle mode UE may have a high probability of being reselected to camp on Cell 1. The communication system may shift idle UEs from overloaded Cell 2 to less loaded Cell 1.

Figure 16:
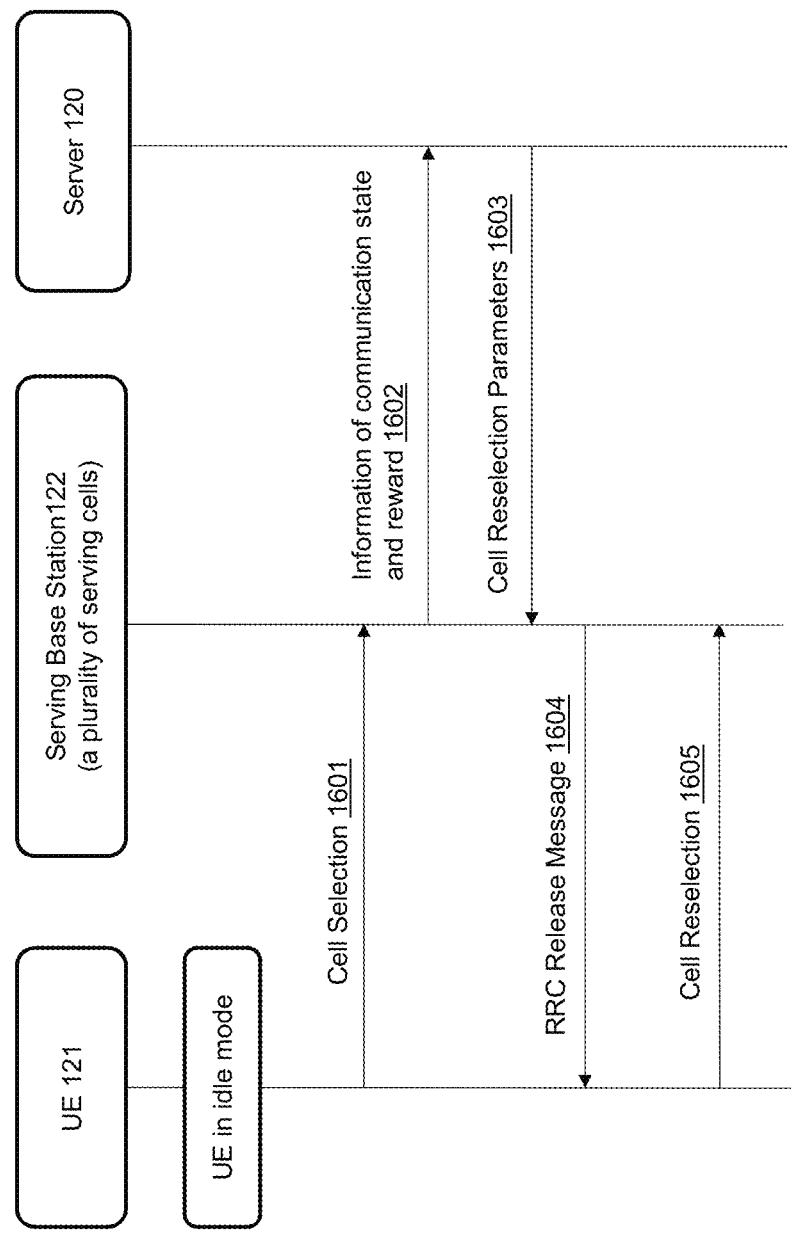
FIG. 16 illustrates a cell reselection process according to embodiments of the present disclosure.

FIG. 16 illustrates a method of communicating with a UE and a BS to perform a cell reselection process according to an example embodiment.

As shown in FIG. 16, the UE 121 in an idle mode may perform an initial cell selection in operation 1601. In order to select an initial cell, the UE 121 may scan all radio frequency (RF) channels in its operating frequency bands and may select an initial cell for the UE to camp on, based on cell selection criterion. For example, the UE 121 may select the initial cell based on various parameters, such as for example, a cell selection reception (RX) level value (Srxlev), a cell selection quality value (Squal), an offset temporarily applied to a cell (Qoffsettemp), a measured cell reception level value (Qqualmeas), a measured cell quality value (Qrxlevmeas), a minimum required RX level in the cell (Qrxlevmin), a minimum required quality level in the cell (Qqualmin). The UE 121 transmits information of the selected initial cell to a base station 122 that manages a plurality of cells, so that the UE 121 in the idle mode camps on the selected initial cell among the plurality of cells.

In operation 1602, the base station 122 may transmit traffic data, including the number of active mode UEs per cell, the cell load ratio, and the IP throughput per cell, to the server 120.

In operation 1603, the server 120 may determine cell reselection parameters based on a new control policy that is generated via operations 210-250, and may transmit the cell reselection parameters to the base station 122. The cell reselection parameters may correspond to cell reselection priorities that are assigned to the plurality of cells $C_1$-$C_7$ shown in FIG. 14.

In operation 1604, the base station 122 may transmit a Radio Resource Control (RRC) Release message including the cell reselection parameters, to the UE 121.

In operation 1605, the UE 121 then may select a target cell to camp on based on the cell reselection parameters, and may send information of the selected target cell to the base station 122. For example, when a second cell $C_2$ has a higher cell reselection priority than the other neighboring cells, $C_1$ and $C_3$-$C_7$, among the plurality of cells $C_1$-$C_7$, the idle mode UE 121 has a higher probability of being reassigned to camp on the second cell $C_2$ than other neighboring cells, $C_1$ and $C_3$-$C_7$.

The method of generating a control policy and performing traffic load balancing according to the control policy may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to electronic device 100, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The forecasting method may be provided in a form of downloadable software. A computer program product may include a product (for example, a downloadable application)

in a form of a software program electronically distributed through a manufacturer or an electronic market. For electronic distribution, at least a part of the software program may be stored in a storage medium or may be temporarily generated. In this case, the storage medium may be a server or a storage medium of the server.

The foregoing disclosure provides illustration and description, but is not intended to be exhaustive or to limit the implementation to the precise form disclosed. Modifications and variations are possible in light of the above disclosure or may be acquired from practice of the implementation.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

The embodiments of the disclosure described above may be written as computer executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to electronic device 1300, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The above described method may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of the electronic device 1300.

A model related to the neural networks described above may be implemented via a software module. When the model is implemented via a software module (for example, a program module including instructions), the model may be stored in a computer-readable recording medium.

Also, the model may be a part of the electronic device 1300 described above by being integrated in a form of a hardware chip. For example, the model may be manufactured in a form of a dedicated hardware chip for artificial intelligence, or may be manufactured as a part of an existing general-purpose processor (for example, a CPU or application processor) or a graphic-dedicated processor (for example a GPU).

Also, the model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

While the embodiments of the disclosure have been described with reference to the figures, it will be understood by those of ordinary skill in the art that various changes in form and details may be made therein without departing from the spirit and scope as defined by the following claims.

What is claimed is:

1. A server for obtaining a load balancing artificial intelligence (AI) model for a plurality of base stations in a communication system, the server comprising:
    at least one memory storing instructions; and
    at least one processor configured to execute the instructions to:
        obtain a plurality of teacher models based on a plurality of traffic data sets collected from the plurality of base stations, respectively;
        obtain a plurality of student models based on knowledge distillation from the plurality of teacher models, wherein the plurality of student models is trained based on a knowledge distillation loss that represents a difference between a teacher prediction of the plurality of teacher models and a student prediction of the plurality of student models, and
        obtain the load balancing AI model for the plurality of base stations based on the plurality of student models.

2. The server of claim 1, wherein the at least one processor further configured to execute the instructions to obtain the load balancing AI model for the plurality of base stations, by:
    obtaining an ensemble student model by ensembling the plurality of student models; and
    transmitting the ensemble student model to the plurality of base stations, respectively.

3. The server of claim 2, the at least one processor further configured to execute the instructions to:
    receive feedback information of the ensemble student model from the plurality of base stations, and
    update the ensemble student model based on the received feedback information.

4. The server of claim 1, wherein the least one processor is further configured to execute the instructions to:
    obtain the plurality of teacher models by receiving model parameters of the plurality of teacher models from the plurality of base stations, and updating initialized model parameters of the plurality of teacher models based on the received model parameters.

5. The server of claim 1, wherein the plurality of traffic data sets comprise state-action-reward trajectories that comprise states, actions, and rewards, the states comprise at least one of an active user equipment (UE) number, a bandwidth utilization, an internet protocol (IP) throughput, a cell physical resource usage, and a speed of a download link, the actions comprise a load balancing parameter that causes the states to be changed, and the rewards comprise at least one of a minimum of IP throughput, a total IP throughput, and a dead cell count.

6. The server of claim 1, wherein each of the plurality of teacher models comprises a state transition model and a reward transition model that are trained based on state-action-reward trajectories that are collected from the plurality of base stations, wherein the state transition model is configured to output a predicted next state based on an action taken in a current state, and wherein the reward transition model is configured to output a predicted reward based on the action taken in the current state.

7. The server of claim 1, wherein the at least one processor further configured to execute the instructions to obtain the plurality of student models based on knowledge distillation from the plurality of teacher models, by:

computing a ground-truth loss based on a difference between a ground-truth value and a prediction of each of the plurality of student models;

computing the knowledge distillation loss based on the difference between the teacher prediction of the plurality of teacher models and the student prediction of the plurality of student models;

computing an aggregated loss that combines the ground-truth loss and the knowledge distillation loss; and training the plurality of student models by minimizing or converging the aggregated loss.

8. The server of claim 1, wherein the least one processor is further configured to execute the instructions to obtain a policy model by:

obtaining state-reward pairs from the plurality of student models;

computing an average of the state-reward pairs;

inputting the average of the state-reward pairs to the policy model to obtain an action as an output of the policy model;

increasing a time step by one;

based on the increased time step being less than a predetermined value, inputting the action to the plurality of student models; and based on the increased time step being equal to the predetermined value, outputting the policy model.

9. The server of claim 2, wherein the least one processor is further configured to execute the instructions to:

obtain a policy model by interacting with the ensemble student model;

provide the policy model to each of the plurality of base stations for a policy evaluation of the policy model; and based on a training continue signal being received from at least one of the plurality of base stations as a result of the policy evaluation, update the ensemble student model and the policy model, wherein the training continue signal is provided as feedback information of the ensemble student model and indicates that a reward obtained from the ensemble student model is less than a reward obtained from an existing load balancing model by a predetermined margin or more.

10. A method for obtaining a load balancing artificial intelligence (AI) model for a plurality of base stations in a communication system, the method comprising:

obtaining a plurality of teacher models based on a plurality of traffic data sets collected from the plurality of base stations, respectively;

obtaining a plurality of student models based on knowledge distillation from the plurality of teacher models, wherein the plurality of student models is trained based on a knowledge distillation loss that represents a difference between a teacher prediction of the plurality of teacher models and a student prediction of the plurality of student models, and obtaining the load balancing AI model for the plurality of base stations based on the plurality of student models.

11. The method of claim 10, wherein the obtaining the load balancing AI model for the plurality of base stations comprises:

obtaining an ensemble student model by ensembling the plurality of student models; and transmitting the ensemble student model to the plurality of base stations, respectively.

12. The method of claim 11, further comprising:

receiving feedback information of the ensemble student model from the plurality of base stations, and updating the ensemble student model based on the received feedback information.

13. The method of claim 10, further comprising:

obtaining the plurality of teacher models by receiving model parameters of the plurality of teacher models from the plurality of base stations, and updating initialized model parameters of the plurality of teacher models based on the received model parameters.

14. The method of claim 10, wherein the plurality of traffic data sets comprise state-action-reward trajectories that comprise states, actions, and rewards, the states comprise at least one of an active user equipment (UE) number, a bandwidth utilization, an internet protocol (IP) throughput, a cell physical resource usage, and a speed of a download link, the actions comprise a load balancing parameter that causes the states to be changed, and the rewards comprise at least one of a minimum of IP throughput, a total IP throughput, and a dead cell count.

15. The method of claim 10, wherein each of the plurality of teacher models comprises a state transition model and a reward transition model that are trained based on state-action-reward trajectories that are collected from the plurality of base stations, wherein the state transition model is configured to output a predicted next state based on an action taken in a current state, and wherein the reward transition model is configured to output a predicted reward based on the action taken in the current state.

16. The method of claim 10, wherein the obtaining the plurality of student models based on knowledge distillation from the plurality of teacher models comprises:

computing a ground-truth loss based on a difference between a ground-truth value and a prediction of each of the plurality of student models;

computing the knowledge distillation loss based on the difference between the teacher prediction of the plurality of teacher models and the student prediction of the plurality of student models;

computing an aggregated loss that combines the ground-truth loss and the knowledge distillation loss; and training the plurality of student models by minimizing or converging the aggregated loss.

17. The method of claim 10, wherein the obtaining a policy model comprises:

obtaining state-reward pairs from the plurality of student models;

computing an average of the state-reward pairs;

inputting the average of the state-reward pairs to the policy model to obtain an action as an output of the policy model;

increasing a time step by one;

based on the increased time step being less than a predetermined value, inputting the action to the plurality of student models; and based on the increased time step being equal to the predetermined value, outputting the policy model.

18. The method of claim 11, further comprising:

obtaining a policy model by interacting with the ensemble student model;

providing the policy model to each of the plurality of base stations for a policy evaluation of the policy model; and based on a training continue signal being received from at least one of the plurality of base stations as a result of the policy evaluation, updating the ensemble student model and the policy model, wherein the training continue signal is provided as feedback information of the ensemble student model and indicates that a reward obtained from the ensemble student model is less than a reward obtained from an existing load balancing model by a predetermined margin or more.

19. A non-transitory computer-readable storage medium storing a program that is executable by at least one processor to perform a method for obtaining a load balancing artificial intelligence (AI) model for a plurality of base stations in a communication system, the method comprising:

obtaining a plurality of teacher models based on a plurality of traffic data sets collected from the plurality of base stations, respectively;

obtaining a plurality of student models based on knowledge distillation from the plurality of teacher models, wherein the plurality of student models is trained based on a knowledge distillation loss that represents a difference between a teacher prediction of the plurality of teacher models and a student prediction of the plurality of student models, and obtaining the load balancing AI model for the plurality of base stations based on the plurality of student models.

20. The non-transitory computer-readable storage medium of claim 19, wherein the obtaining the load balancing AI model for the plurality of base stations comprises:

obtaining an ensemble student model by ensembling the plurality of student models; and transmitting the ensemble student model to the plurality of base stations, respectively.

* * * * *